(12) United States Patent
Rafferty et al.

(10) Patent No.: US 11,062,307 B2
(45) Date of Patent: Jul. 13, 2021

(54) SYSTEM AND METHOD OF USING LOCALIZED BLOCKCHAIN TO ENABLE PAYMENT CARD USE WITHOUT CONNECTIVITY

(71) Applicant: Capital One Services, LLC, McLean, VA (US)

(72) Inventors: Galen Rafferty, Mahomet, IL (US); Austin Grant Walters, Savoy, IL (US); Vincent Pham, Champaign, IL (US); Anh Truong, Champaign, IL (US); Jeremy Edward Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 63 days.

(21) Appl. No.: 16/551,275

(22) Filed: Aug. 26, 2019

(65) Prior Publication Data
US 2021/0065167 A1   Mar. 4, 2021

(51) Int. Cl.
*G06Q 20/38* (2012.01)
*G06Q 20/20* (2012.01)
(Continued)

(52) U.S. Cl.
CPC ......... *G06Q 20/389* (2013.01); *G06Q 20/202* (2013.01)

(58) Field of Classification Search
CPC ........ G06Q 20/10; G06Q 20/20; G06Q 20/06; G06Q 20/102; G06Q 20/204;
(Continued)

(56) References Cited

U.S. PATENT DOCUMENTS 3,982,103 A * 9/1976 Goldman ................. G06K 7/08
                                                   235/380
10,049,349 B1 * 8/2018 Grassadonia .......... G06Q 20/40
(Continued)

OTHER PUBLICATIONS

Author unknown, "CryptoFuse™ The World's First Offline Blockchain", CryptoFuse, Inc., May 3, 2018, Whitepaper Version 1.2, 25 pages.
(Continued)

*Primary Examiner* — Florian M Zeender
*Assistant Examiner* — Dana Amsdell
(74) *Attorney, Agent, or Firm* — Kacvinsky Daisak Bluni PLLC

(57) ABSTRACT

Examples for enabling off-network transactions to be performed and securely managed are provided. An example system may include a data network, a digital ledger server, a blockchain platform, smart payment devices, and point of sale devices. Each respective point of sale device and each respective smart device may be operable to perform an off-network transaction, and store information related to the transaction in a digital ledger coupled to each respective device. When a transaction is executed between a POS device and a smart payment device, the POS device and smart payment device exchange a record of all off-network transactions that each respective device has executed since the last time a connection was made to the data network. When a network connection is established for each device, the respective information stored in the digital ledger is uploaded to the blockchain platform for storage and the digital ledger server for transaction resolution.

19 Claims, 16 Drawing Sheets

(51) Int. Cl.
*G06Q 20/16* (2012.01)
*H04L 29/00* (2006.01)

(58) Field of Classification Search
CPC .... G06Q 20/322; G06Q 20/202; G06Q 20/32; G06Q 20/38; G06Q 20/3825; G06Q 20/3829; G06Q 20/40975; G06Q 30/0215; H04L 2209/38; H04L 9/3236; H04L 2209/56; H04L 63/10; H04L 9/3268

See application file for complete search history.

(56) References Cited

U.S. PATENT DOCUMENTS

| | | | | |
|---|---|---|---|---|
| 10,579,994 | B1* | 3/2020 | Walters | G06Q 20/223 |
| 10,637,644 | B1* | 4/2020 | Walters | G06Q 20/065 |
| 10,861,008 | B2* | 12/2020 | Walters | G07F 7/0873 |
| 2015/0046337 | A1* | 2/2015 | Hu | G06Q 20/0658 705/65 |
| 2015/0170112 | A1 | 6/2015 | DeCastro | |
| 2016/0321654 | A1* | 11/2016 | Lesavich | H04L 67/10 |
| 2017/0017955 | A1* | 1/2017 | Stern | H04W 4/024 |
| 2017/0048209 | A1* | 2/2017 | Lohe | G06Q 20/384 |
| 2017/0083907 | A1* | 3/2017 | McDonough | G06Q 20/3829 |
| 2017/0236121 | A1* | 8/2017 | Lyons | G06Q 20/40975 705/71 |
| 2018/0039982 | A1* | 2/2018 | Metnick | G06Q 20/405 |
| 2018/0109541 | A1* | 4/2018 | Gleichauf | H04W 12/10 |
| 2018/0260795 | A1* | 9/2018 | Maenpaa | G06Q 20/3433 |
| 2018/0276666 | A1* | 9/2018 | Haldenby | G06Q 20/20 |
| 2018/0293555 | A1* | 10/2018 | Handoko | G06Q 20/36 |
| 2019/0081793 | A1* | 3/2019 | Martino | H04L 9/0894 |
| 2019/0180237 | A1* | 6/2019 | Mattingly | G06Q 10/08355 |
| 2019/0295081 | A1* | 9/2019 | Simon | G06F 16/27 |
| 2019/0311358 | A1* | 10/2019 | Bhagavatha | G06Q 20/3829 |
| 2019/0347624 | A1* | 11/2019 | Pustizzi | G06Q 20/3274 |
| 2020/0005267 | A1* | 1/2020 | Siefken | G06Q 20/209 |
| 2020/0051368 | A1* | 2/2020 | Pustizzi | H04L 9/0637 |
| 2020/0136843 | A1* | 4/2020 | Chalakudi | H04L 63/0435 |
| 2020/0143364 | A1* | 5/2020 | Walters | G06Q 20/16 |
| 2020/0211011 | A1* | 7/2020 | Anderson | G06Q 20/3823 |
| 2020/0380826 | A1* | 12/2020 | Taylor | H04L 9/3239 |

OTHER PUBLICATIONS

Author unknown, "Blockchain and Smart Card Technology", A Secure Technology Alliance Payments Council White Paper, Version 1.0, Mar. 2017, 34 pages.

\* cited by examiner

388

391

Determine that a connection with a data network is unable to be established

392

Generate information related to the present transaction in response to participating in a present transaction with a point of sale device while the connection with the data network is unable to be established

393

Upon completion of the present transaction, receive, from the point of sale device, a copy of past transaction information of transactions executed by the point of sale device

394

Send to the point of sale device a copy of past transaction information of the smart payment device

395

Store, until a connection to the enterprise network is established, the generated information related to the present transaction, the past transaction information of the smart payment device, and the copy of the past transaction information received from the point of sale device in a digital ledger in a memory of the smart payment device

*FIG. 3C*

SYSTEM AND METHOD OF USING LOCALIZED BLOCKCHAIN TO ENABLE PAYMENT CARD USE WITHOUT CONNECTIVITY

BACKGROUND

As society moves increasingly to a cashless commerce system, techniques to facilitate use of payment cards as a payment method are becoming more prevalent. For example, contactless cards and near-field communication device-equipped mobile devices hosting payment applications enable users to purchase items by merely moving the card or device near a point of sale device.

However, many of these payment techniques and devices rely on a near constant connection to a data network, whether Wi-Fi or a cellular network. As a result, point of sale devices or remote payment devices have to be tethered to a network connection in order to enable the transaction to be recorded, cleared by a financial institution and ultimately the funds being transferred to In remote locations, places without reliable network connectivity, or places where it is risky (e.g., a canoe trip, a wilderness excursion, etc.) to carry large amounts of cash, conducting credit card transactions using only the point of sale device and the credit card without the need for a live network improves security and allows for increased credit card use. However, techniques or systems that enable the transactions need to be reliably recorded in a secure manner and ultimately provided to the financial institutions to allow for payments to be transacted are unavailable. The following discuses an approach to fulfilling these needs and improvements to the current technology.

SUMMARY

A method is provided that determines by a point of sale device that a connection with a data communication network is unestablished. A point of sale ledger of transactions may be maintained in a point of sale memory of the point of sale device that includes information related to all transactions previously performed by the point of sale device with one or more smart payment devices, while the point of sale device was unable to establish the connection with the data communication network. A respective smart payment digital ledger of transactions may be maintained in a respective smart payment device memory of a respective smart payment device of the one or more smart payment devices. Each respective smart payment digital ledger in each respective smart payment device memory of the respective smart payment device of the one or more smart payment devices includes information related to all transactions previously performed by the respective smart payment device while the one or more smart payment devices were unable to establish the connection with the data communication network. The point of sale device may conduct a respective transaction with each respective smart payment device of the one or more smart payment devices. In response to the respective transaction being conducted with each respective smart payment device: the point of sale device may store information related to the respective transaction being conducted with each respective smart payment device of the one or more smart payment device in the point of sale ledger with information related to transactions previously performed by the point of sale device; the respective smart payment device may provide instruction to store information related to the respective transaction being conducted with the point of sale device in a smart payment device digital ledger of the respective smart payment device with the information related to transactions previously performed by the respective smart payment device; the point of sale device may send the information related to transactions previously performed by the point of sale device and information related to the transaction being conducted to the respective smart payment device currently participating in the transaction being conducted to the respective smart payment device for storage in the smart payment digital ledger; and receive, from the respective smart payment device currently participating in the transaction being conducted with the point of sale device, the information related to all transactions previously performed by the respective smart payment device to the point of sale device for storage in the point of sale ledger. The point of sale device may, when the point of sale device establishes a connection with the data communication network, upload transactions stored in the point of sale ledger of the point of sale device to a blockchain platform. The blockchain platform is operable to receive each respective smart payment device of the one or more smart payment devices transactions stored in a smart payment digital ledger of each respective smart payment device to the blockchain platform whenever each respective smart payment device of the one or more smart payment devices establishes a connection with the data communication network. The point of sale device, upon receiving an indication of a successful uploading, may clear the point of sale ledger in the point of sale device memory.

Another aspect may be a non-transitory computer readable medium storing programming code storing programming code when executed is operable to cause a processor of a smart payment device to perform functions, including functions to determine that a connection with a data network is unable to be established. In response to participating in a present transaction with a point of sale device while the connection with the data network is unable to be established, information related to the present transaction may be generated. Upon completion of the present transaction, a copy of past transaction information of transactions executed by point of sale device may be received from the point of sale device. The copy of past transaction information of the point of sale device is related to each past transaction in which the point of sale device participated since the point of sale device last connected to the data network. A copy of past transaction information of the smart payment device may be sent to the point of sale device. The past transaction information in the copy of the past transaction information of the smart payment device is related to each past transaction in which the smart payment device participated since the smart payment device last connected to the data network. The generated information related to the present transaction, the past transaction information of the smart payment device, and the copy of the past transaction information received from the point of sale device may be stored in a digital ledger in a memory of the smart payment device until a connection to the data network is established.

According to a further aspect, a system example is provided that includes a data network, a digital ledger server, a private blockchain platform, one or more smart payment devices, and a number of point of sale devices. The data network may be operable to exchange data between the digital ledger server, the private blockchain platform, and the number of point of sale devices. The digital ledger server includes a processor and a digital ledger resolution component. The digital ledger server may be coupled to the data network and operable to resolve digital ledgers received via the data network. The private blockchain platform may include a number of nodes operable to process and store digital ledgers. The private blockchain platform is coupled to the digital ledger server. Each of the number of the point of sale devices includes a point of sale device processor operable to perform transactions, a communications interface, a point of sale memory, and one or more radio frequency transceivers operable to connect to the data network via the communications interface. At least a portion of the number of point of sale devices are portable point of sale devices, and the number of point of sale devices are operable to perform transactions to sell items or services. A respective point of sale memory in each respective point of sale device of the number of point of sale devices is operable to store transaction information of the transactions performed by each respective point of sale device of the number of point of sale devices. Each of the one or more smart payment devices may include a smart payment device processor, a smart payment device memory, a secure electronic device, and a radio frequency transceiver. Each smart payment device processor, while disconnected from the data network, and each of the one or more smart payment devices is operable to store smart payment device transaction information of transactions participated in by the smart payment device in the smart payment device memory, and when participating in a transaction with a respective point of sale device of the plurality of point of sale devices, may send smart payment device transaction information to a point of sale memory of the respective point of sale device during the transaction.

BRIEF DESCRIPTION OF THE DRAWINGS

FIG. 3C illustrates another flowchart of an example of a process for executing off-network transactions by either a point of sale device or a smart payment device.

These and other features of the disclosed subject matter will now be described with reference to the figures, wherein like reference numerals are used to refer to like elements throughout.

DETAILED DESCRIPTION

The subject matter disclosed herein may utilize digital copy ledgers and elements of a blockchain platform.

Figure 1:
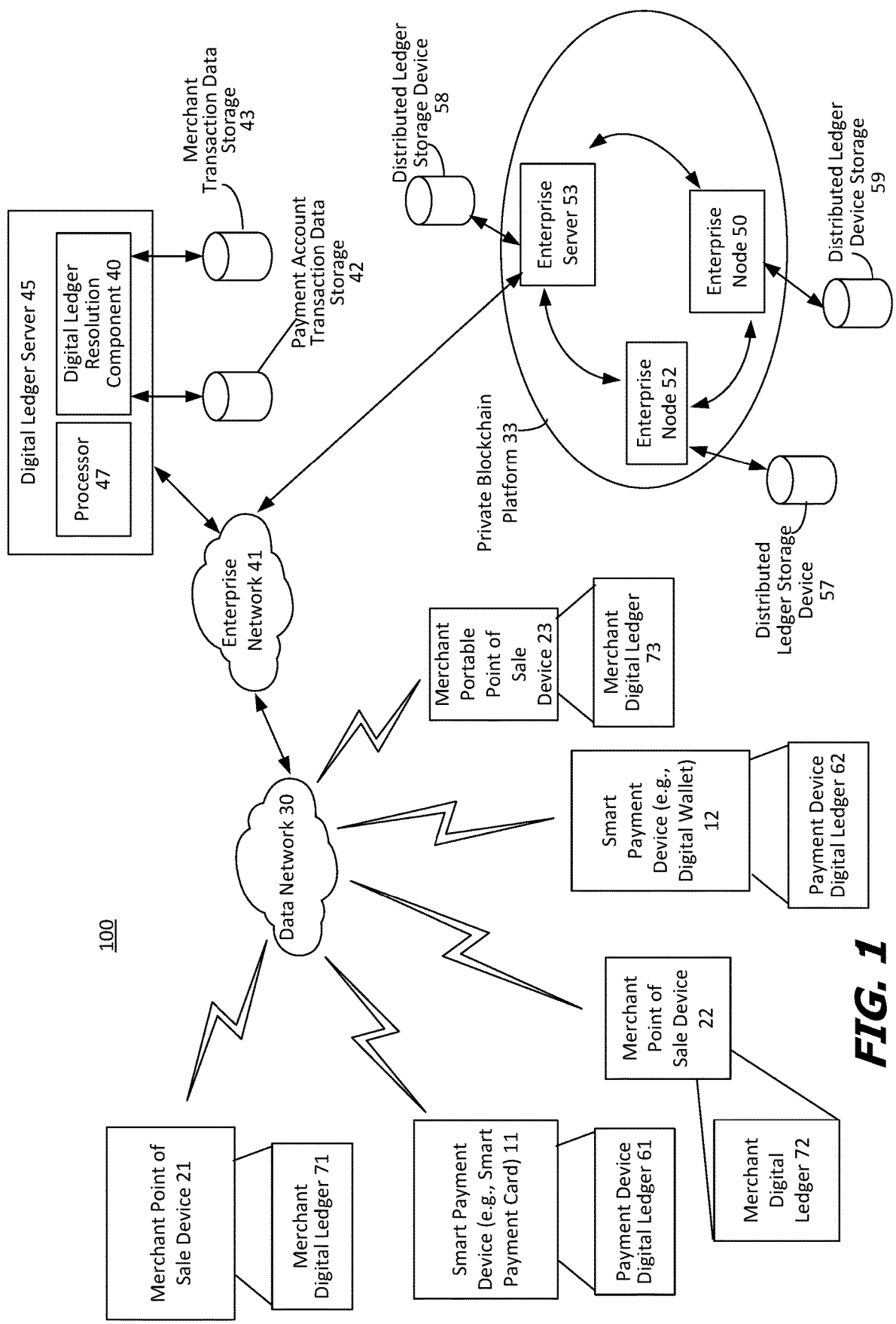
FIG. 1 illustrates a block diagram illustrating an example of system suitable for implementing the techniques described herein.

FIG. 1 illustrates a block diagram illustrating an example of system suitable for implementing the techniques described herein. In FIG. 1, the system 100 example is provided that includes a data network 30, a digital ledger server 45, a private blockchain platform 33, a number of smart payment devices, such as 11 and 12, and a number of point of sale devices, such as 21 and 23. The digital ledger server 45 may include a processor 47 and digital ledger resolution component 40. The digital ledger server 45, digital ledger resolution component 40 or both may be coupled to a payment account transaction data storage 42 and a merchant transaction data storage 43. The digital ledger resolution component 40 may be hardware, software, firmware, a combination of hardware and software that is operable to perform account resolution functions. The private blockchain platform 33 may include a number of nodes (e.g., computing devices operable to process the respective transactions and manage members of the private blockchain platform 33), such as enterprise nodes 50 and 52. The private blockchain platform 33 may be managed by a server, such as an enterprise server 53. Each enterprise node 50 and 52 may be coupled to a respective data storage, such as distributed ledger storage device 57 and distributed ledger storage device 59. The enterprise server 53 is also coupled to as distributed ledger storage device 58. In addition to performing management functions for the private blockchain platform 33, the enterprise server 53 may also perform node functions (described in more detail below) within the private blockchain platform 33. The enterprise server 53, the enterprise node 50 and enterprise node 52 may communicate with one another and perform functions of nodes within the private blockchain platform 33.

The digital ledger server 45 and the private blockchain platform 33 may be part of an enterprise (not shown). For example, the enterprise may include an enterprise network 41 that is coupled to and enables communication between the digital ledger server 45 and the private blockchain platform 33. In operation, the digital ledger server 45 may utilize the digital ledger resolution component 40 to resolve the off-network transactions performed by the respective smart payment devices (e.g., 11 and 12) and respective merchant point of sale (POS) devices (e.g., 21, 22 and 23). For example, the digital ledger resolution component 40 may determine which accounts are to be credited or debited, payment account and merchant account fund transfers, and similar accounting functions. The off-network transaction information from the respective digital ledgers 61, 62 and 63 of the respective merchant POS devices 21, 22 and 23, in addition to be provided to the digital ledger server 45 may be stored in a blockchain of the private blockchain platform 33 according to known blockchain techniques. Examples of which are described in more detail with reference to FIGS. 12 and 13. If necessary, the digital ledger server 45 may access or request transaction records from the blockchain platform 33.

In the example of FIG. 1, the data network 30 may be operable to exchange data between the digital ledger server 45, the private blockchain platform 33, and the number of point of sale devices, such as 21 and 22. In some instances, a point of sale device may be a merchant portable point of sale device, such as 23, that may be a mobile smart phone, a Wi-Fi or cellular-equipped tablet, or the like that has a payment card reader (not shown) attached to receive payment card information, transaction related information, or the like. In the example, the merchant portable point of sale device 23 may be operable to make a wireless connection to an access point associated with the merchant (not shown) or, if suitably equipped and if a connection is available, directly to the data network 30. Other devices as well may be coupled to the data network 30. For example, smart payment devices, such as 11 and 12, are also coupled to the data network 30. Each point of sale device, whether remote or not, such as point of sale devices 21, 22 and 23 includes a merchant digital ledger 71, 72 and 73, respectively. Similarly, each smart payment device 11 and 12 includes a payment digital ledger 61 and 62. It is noted that the data network 30 may not always be available to the respective POS devices 61-63 and/or the respective smart devices 11 and 12. For example, the respective POS devices 61-63 and/or the respective smart devices 11 and 12 may be in a location that does not have an access point to the data network 30, the data network 30 is experiencing an outage, or the like. However, in cases when the data network 30 is unavailable and/or the respective POS devices and respective smart payment devices are unable to make a connection to the data network to verify or authenticate information related to the transaction, the respective POS devices and respective smart payment devices may be operable as described in the disclosed examples to perform an off-network transaction. When performing the off-network transactions, the respective point of sale device may store point of sale device transaction information, and similarly the respective smart payment device may store smart payment device transaction information. The point of sale device transaction information or the smart payment device transaction information includes at least one of a merchant identifier associated with the point of sale device, an account identifier associated with the respective smart payment device participating in the respective transaction, a time stamp, a date stamp, an amount of the transaction, taxes, a respective transaction identifier, a customer name associated with the respective smart payment device, a transaction hash value, or a respective smart payment device identifier.

The digital ledger server 45 may be coupled to the data network 30 and operable to resolve digital ledgers received via the data network 30. While only two nodes are shown in the private blockchain platform 33, the number of nodes in the private blockchain platform 33 may operable to process and store digital ledgers and/or information related to the digital ledgers.

In a brief operational example, the system 100 may be operable to perform different functions. For example, a respective point of sale device, such as 61, of system 100 may be operable to upon establishing a connection to the data network, access the digital ledger server 45. The respective point of sale device 61 may be able to authenticate itself to the digital ledger server 45. Upon authentication, the respective point of sale device 61 may forward via the established connection to the data network the smart payment device transaction information and transaction information of the transactions performed by the respective point of sale device to the digital ledger server 45. The digital ledger server 45 may be operable to store the uploaded smart payment device transaction information in a payment account transaction data storage and store transaction information of the transactions performed by the respective point of sale device in a merchant transaction data storage. In more detail, the digital ledger resolution component may be operable to resolve the smart payment device transaction information stored in the payment account transaction data storage with the transaction information of the transactions performed by the respective point of sale device stored in merchant transaction data storage. In addition, the respective point of sale device may, during (including at completion of) each respective transaction, be operable to generate a transaction hash value. Each transaction may have a hash value which is stored with transaction information related to the transaction. While still in communication with the smart payment device, the respective point of sale device may upload the generated transaction hash with copies of generated transaction records stored in the point of sale memory to each respective smart payment device memory (shown in other examples) and deliver copies of generated transaction records stored in each respective smart payment device memory to the point of sale memory (shown in other examples). The copies of the generated transaction records include a respective transaction hash value generated for each transaction in the copies of transaction records stored in the point of sale memory and the copies of transaction records stored in each respective smart payment device memory.

When generating the transaction hash value during (including at the completion of) each respective transaction, the respective point of sale device (such as 11 or 12) may, for example, be operable to apply a hash function to at least one of: a merchant identifier associated with the respective point of sale device, an account identifier associated with the respective smart payment device participating in the respective transaction, an amount of the transaction, a time stamp, a date stamp, or a respective transaction identifier. The respective point of sale device may be further operable to establish a connection with the data network 30. Upon establishing the connection with the data network 30, upload the generated transaction hash value to a number of nodes, such as 50, 52 and 53, in a private blockchain platform 33 via the data network 30.

Figure 2B:
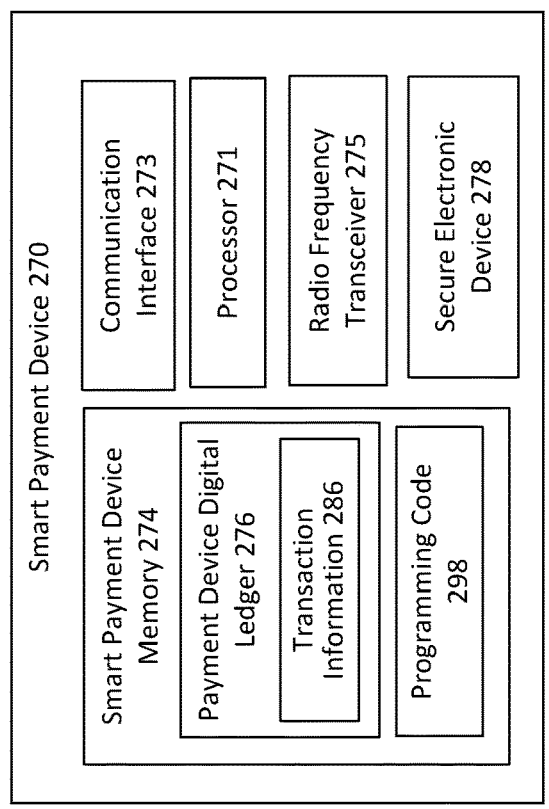
FIG. 2B is a block diagram of an example of a smart payment device suitable for use in the system example of FIG. 1 and operable to execute the processes described herein.
Figure 2A:
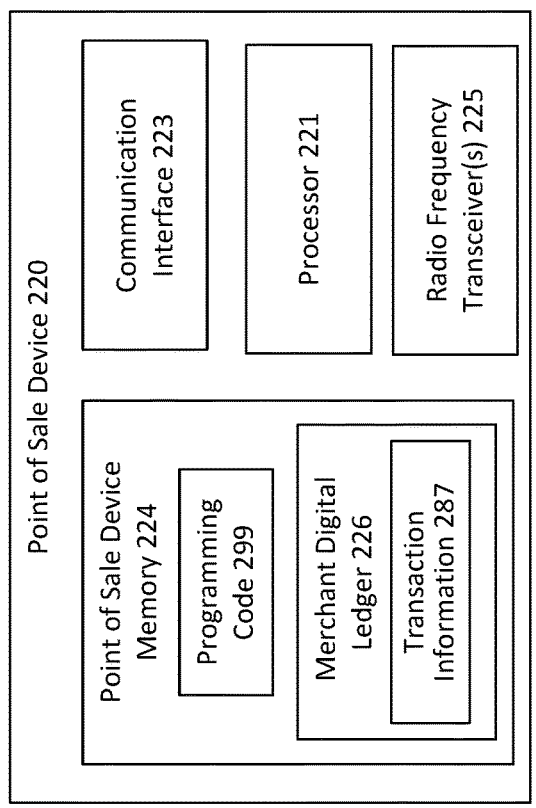
FIG. 2A is a block diagram of an example of a point of sale device suitable for use in the system example of FIG. 1 and operable to execute the processes described herein.

While the forgoing was a brief operational example to provide some context to the operation of the system 100, it may be helpful to describe more details of an example of a point of sale device and an example of a smart payment device. FIG. 2A illustrates an example of a point of sale device. In the example of FIG. 2A, a point of sale device may include a point of sale device processor 221 operable to perform transactions, a communications interface 223, a point of sale memory 224, and one or more radio frequency (RF) transceivers 225. The one or more RF transceivers may be coupled to the communications interface and operable to connect to a data network, such as 30 in FIG. 1, via the communications interface 223. The communications interface 223 may include one or more antennas compatible with the signaling and frequency requirements of a respective one or more of the one or more RF transceivers 225. In addition, the communications interface 223 may include different ports or connector inputs, such as a universal serial bus (USB) connector, a micro USB connector, or the like. A respective point of sale memory, such as 224, in each respective point of sale device of the number of point of sale devices, such as those shown in FIG. 1, is operable to store transaction information 287 of the transactions performed by the respective point of sale device with a number of point of sale devices, such as 11 and 12, in a digital ledger 226.

The point of sale device 220 may be operable to perform various functions in response to execution of programing code 299 stored in memory 224. In an example of a process executed by the point of sale device upon execution of the programming code 299 by the processor 221, the point of sale device may FIG. 2B illustrates an example of a smart payment device. A system, such as 100, includes one or more smart payment devices, such as 11 and 12. The smart payment device 270 of FIG. 2B. Each of the one or more smart payment devices 270 may include a smart payment device processor 271, a smart payment device memory 274, a secure electronic device 278, a communication interface 273, and a radio frequency transceiver 275.

The smart payment device memory 274 may include programming code 298 and a payment device digital ledger 276. Within the payment device digital ledger 276 may be stored transaction information 286 that is described in more detail with reference to the examples of FIGS. 3A-10. The programming code 298 may be executable by the processor 271 to perform functions The communication interface 273 and radio frequency transceiver 275 may enable communications with a data network, such as data network 130 of FIG. 1.

Each smart payment device processor 274 may be operable to perform different functions. The smart payment device processor 274 may be operable to automatically attempt to connect with the digital ledger server 45. For example, the smart payment device processor may attempt to connect after a few days or weeks, after a predetermined number of off-network transactions are performed, upon detection of an available access point, or the like. When a connection to a data network, such as data network 30, is available, in an attempt, in order to deliver ledger information and other data stored in the payment device digital ledger 276. While disconnected from a data network, such as data network 30, each smart payment device 270 of a number, such as one or more, of smart payment devices, may be operable to store ledger information including transaction information 286 in a smart payment digital ledger 276 of the respective smart payment device memory 274. The ledger information stored in the smart payment digital ledger 276 may, for example, include transaction information of transactions participated in by the smart payment device. As explained in more detail with reference to a process example and ledger examples of FIGS. 3A, 3B and 4-9, the smart payment device 270, when participating in a transaction with a respective point of sale device, such as 220, of a number of point of sale devices, may send smart payment device transaction information stored in the respective smart payment devices memory 274 to a point of sale memory, such as point of sale device memory 224 of a respective point of sale device, such as 220, during the transaction. The smart payment device transaction information sent by the smart payment device 270 may be stored in the merchant digital ledger 226 of the point of sale device memory 224. Additional details of a smart payment device suitable for use with the described systems and techniques are disclosed in U.S. application Ser. No. 16/230,437 entitled "A System and Method for Optimizing Cryptocurrency Transactions," filed Dec. 21, 2018, the entire contents of which are incorporated herein by reference.

It may be beneficial to discuss a process example with reference to a graphic representation of the contents of a merchant digital ledger and respective payment device digital ledgers of several smart payment devices.

Figure 3A:
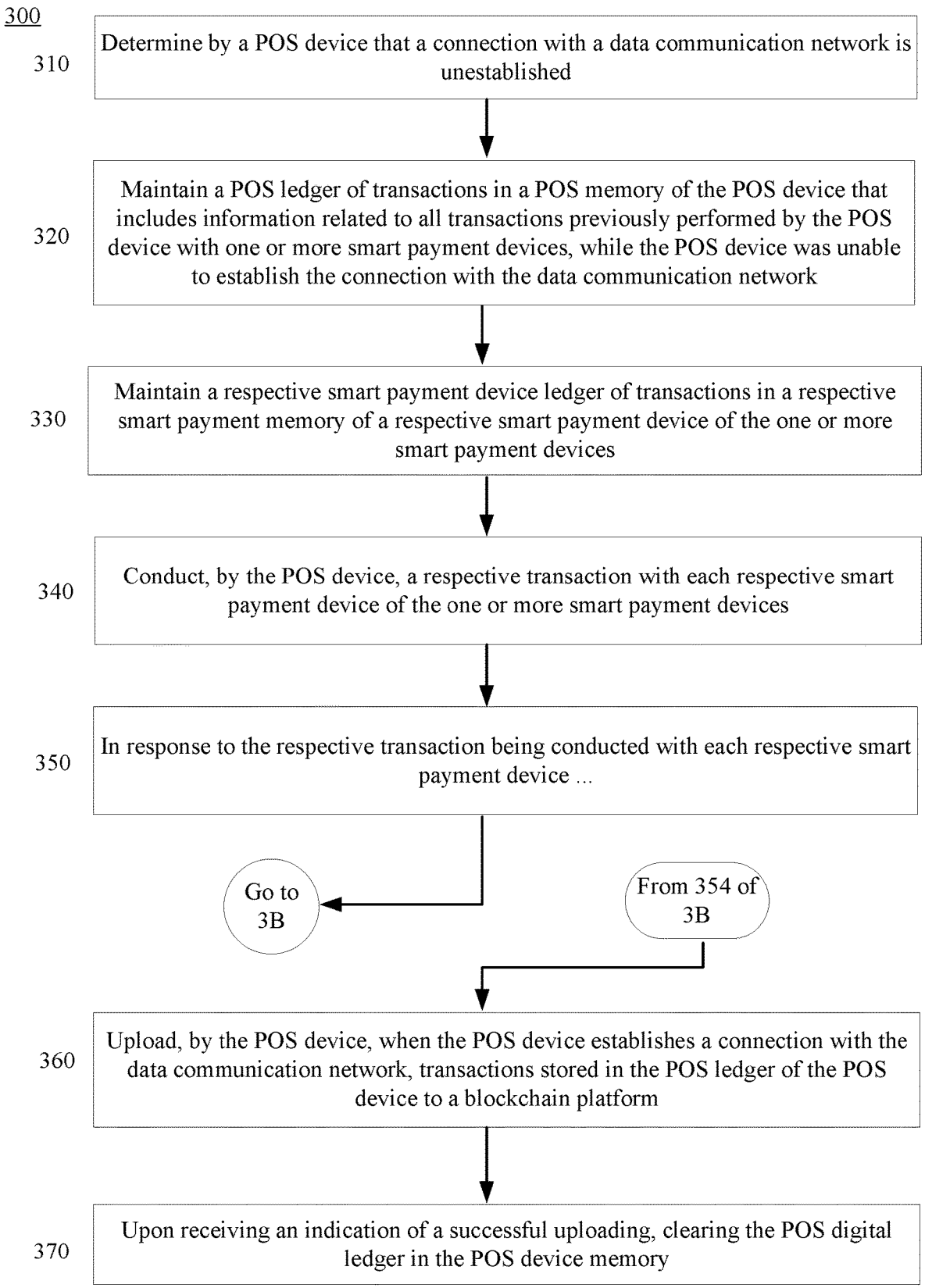
FIGS. 3A and 3B are flowcharts illustrating example steps of a process for completing off-network transactions that may be performed by a point of sale device in the system of FIG. 1 to program a transaction device.
Figure 3B:
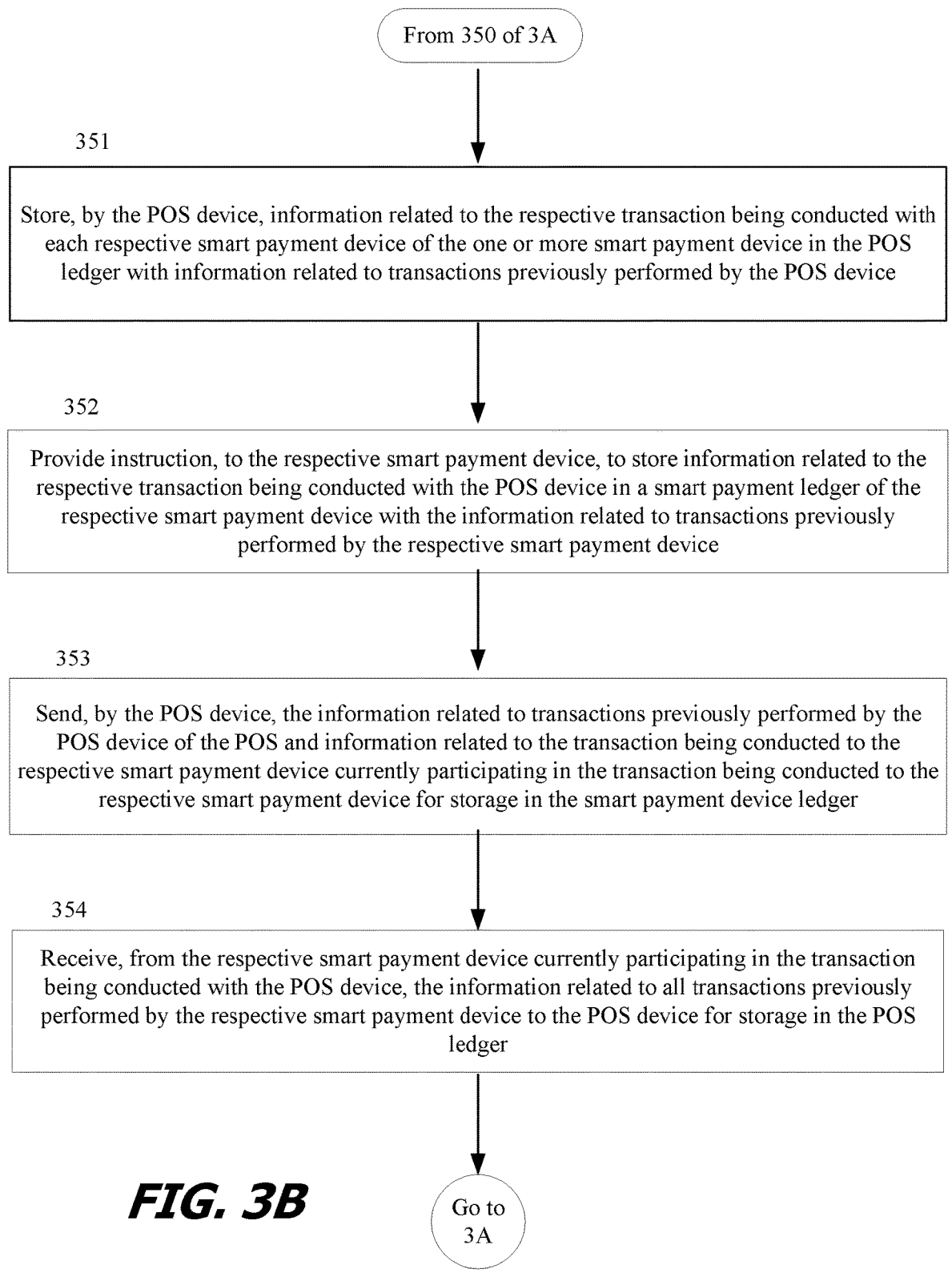

FIGS. 3A and 3B illustrate an example of a process for enabling secure remote transactions and reconciliation of transactions. The example process 300 may be a process performed by a point of sale device located at a remote location, such as fishing bait shop in the Colorado Rockies or in the Alaska Tordrillo range, or the like.

In the example process of FIG. 3A, a POS device, such as those of FIG. 1, may determine that a connection with a data communication network, such as network 30 of FIG. 1, is unestablished (310). For example, the POS device is unable to establish a wired or wireless connection with a data communication network, such as data network 30, because the data network is unavailable, an access point to the data network is not available to the POS device, the POS device is unable to make a wired or wireless connection to the data network, or the like. However, in cases when the data network is unavailable the respective POS devices and respective smart payment devices are unable to make a connection to the data network to verify or authenticate information related to the transaction, the respective POS devices and respective smart payment devices may be operable to perform an off-network transaction.

In order to assure that enough funds are available to the user of the smart payment device, the enterprise, financial institution or the service provider may provide initial information to the smart payment device that indicates to the POS device that funds (e.g., a threshold currency amount, such as one-thousand dollars or the like) are available for the transaction. A form of synchronization with the enterprise, financial institution or the service provider enables a reconciliation of the transactions. For example, a customer may have synchronized their smart payment device with the financial institution so that the customer's payment account is reconciled, all funds owed to merchants or the like are disbursed, and any refunds are credited to the customer's account. Upon synchronization, a time stamp may be generated and stored on the customer's smart payment device and by the financial institution. There may be an application executing on the smart payment device that allows a user to keep track of their account balance and spending limits.

Alternatively, a hash on the digital wallet of a smart payment device may serve as a timestamp of last time a purchase was made (i.e. a transaction was executed) either on-network (i.e., a connection with the data network was established) or off-network. A first purchase off-network may be allowed and a subsequent hash value may be generated. Based on the hash value, a token value or another identifier related to the hash value or generated by a hash function, a second off-network purchase from another off-network POS device may not be permitted without synchronizing with the network (i.e., a digital ledger server). The number of permitted off-network transactions may be determined based on the creditworthiness of the smart payment device holder or based on some other metric for setting the number of permitted off-network transactions.

The POS device is operable to maintain a point of sale ledger of transactions in a point of sale memory of the point of sale device (320). The point of sale ledger may, for example, include information related to all transactions previously performed by the point of sale device with one or more smart payment devices, while the point of sale device was unable to establish the connection with the data communication network. Alternatively, the POS device may maintain a merchant digital ledger that stores all transactions by the merchant in which payment cards issued by a particular enterprise, financial institution or service provider are used in the transaction.

At 330, each respective smart payment device may maintain a respective smart payment digital ledger of transactions in the memory of the respective smart payment device of the one or more smart payment devices. Similarly, each respective smart payment digital ledger in each respective smart payment device memory includes information related to all transactions previously performed by the respective smart payment device while the respective smart payment devices were unable to establish the connection with the data communication network.

The point of sale device may conduct a respective transaction with each respective smart payment device of the one or more smart payment devices (340). As a subprocess within process 300, the point of sale device may in response to the respective transaction being conducted with each respective smart payment device (350) perform different functions that for ease of illustration are shown in FIG. 3B.

Figure 4:
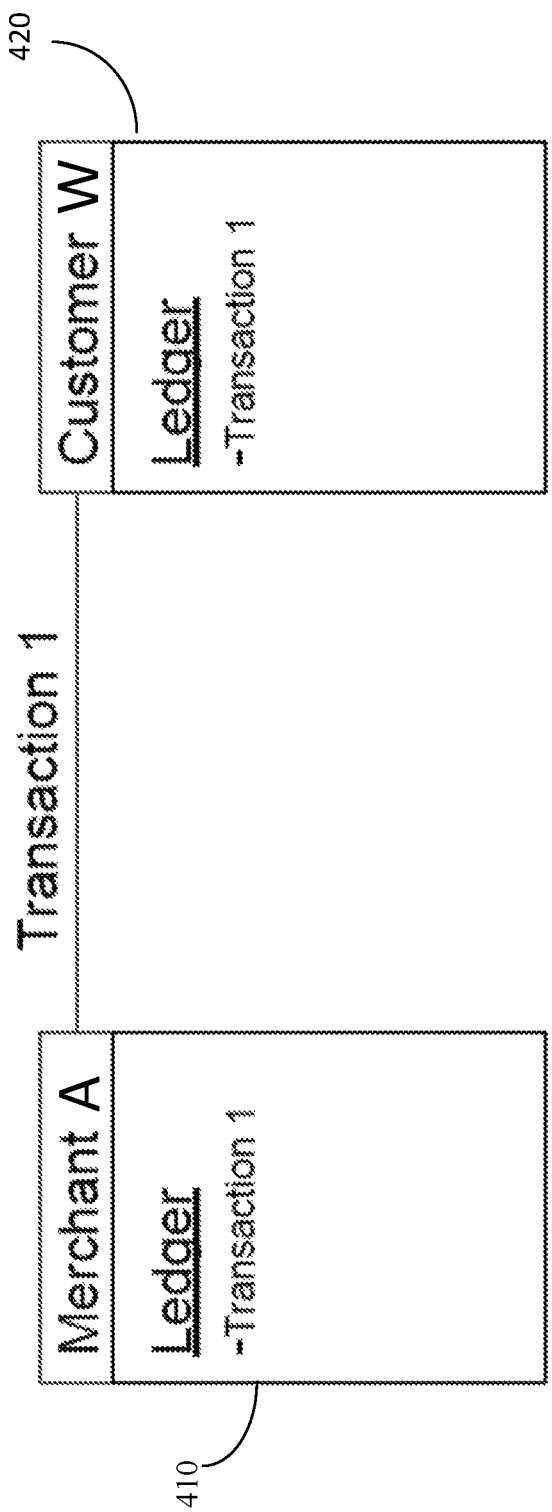
FIGS. 4-10 illustrate information flow with respect to a number of off-network transactions as performed by the example system of FIG. 1 and one or more of the example processes of FIGS. 3A-C.
Figure 5:
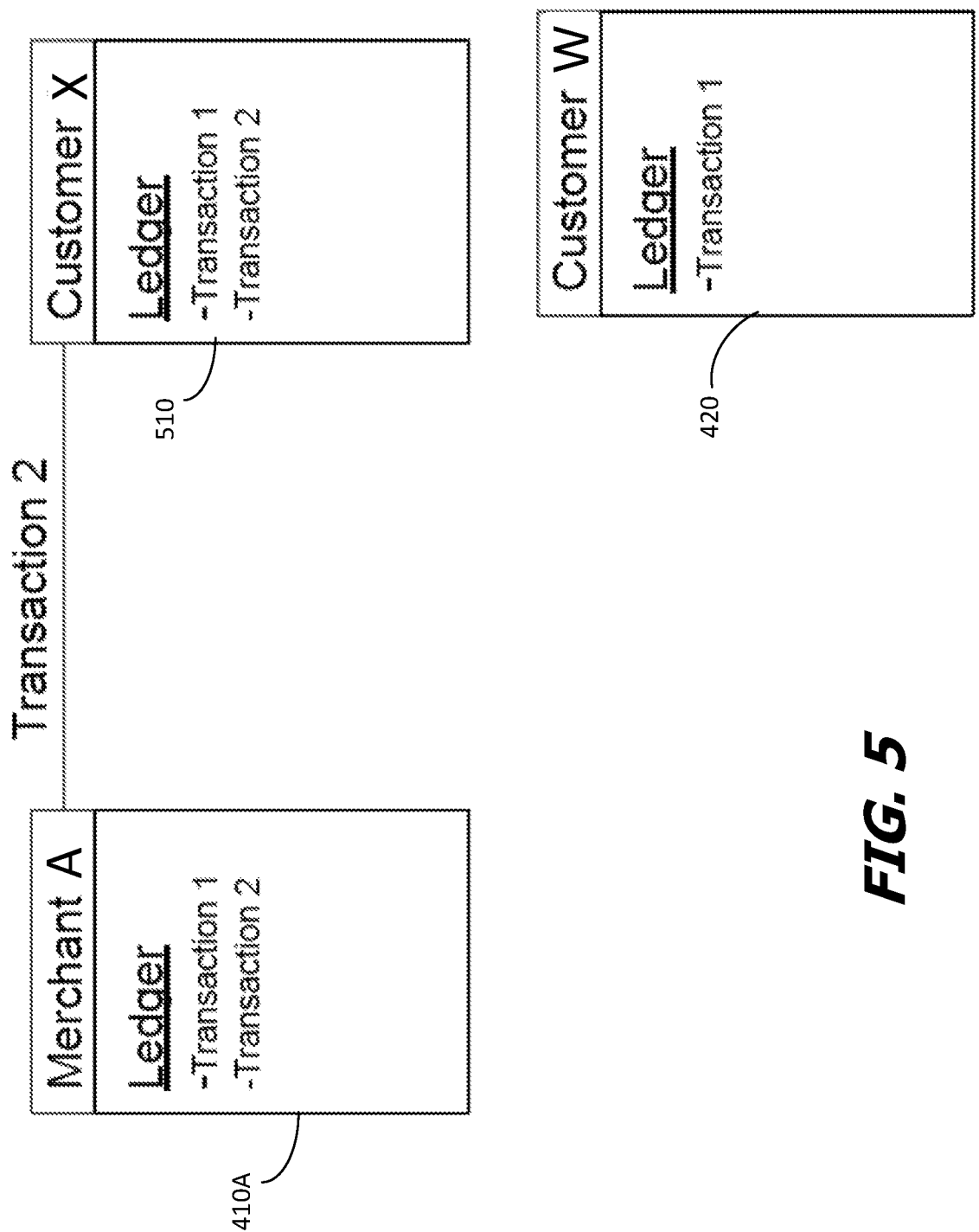

At FIG. 3B, the respective POS device may, in response to the respective transaction being conducted, be operable to perform functions for the respective transaction being conducted with each respective smart payment device. For example, the POS device may be operable to store information related to the respective transaction being conducted with each respective smart payment device of the one or more smart payment device in the point of sale ledger with information related to transactions previously performed by the point of sale device (351). As an example, FIG. 4 illustrates the storing of information related to a transaction between a merchant, such as Merchant A and a smart payment device possessed by Customer W. Merchant A may have a digital ledger 410 that is storing a first transaction perhaps, for example, since last having a connection to a network that enables the transfer of the contents of the POS device's digital ledger. In the example of FIG. 4, the point of sale device, being unable to make a connection to a network may provide instructions, for example, to the respective smart payment device, such as a smart payment device possessed by Customer W, to store information related to the respective transaction being conducted with the point of sale device in a smart payment device digital ledger of the respective smart payment device. For example, the Customer W smart payment device may store the information related to transactions previously performed by the respective smart payment device (352) in the digital ledger 420 of the smart payment device in the possession of Customer W. In a subsequent transaction between the POS device and another different customer, such as the transaction shown in FIG. 5. In the example, Merchant A may execute another transaction (i.e., transaction 2) with another smart payment device possessed by a different customer, such as Customer X. The transaction information from transaction 2 is stored in the digital ledger 410A of Merchant A with the transaction information of transaction 1. Upon performance of transaction 2, the smart payment device of Customer X may store information related to transaction 2 but may also receive from the Merchant A POS device information related to transaction 1. The smart payment device of Customer X may store the information of transactions 1 and 2 in the smart payment device's digital ledger 510. The digital ledger 420 of the smart payment device possessed by Customer W still only includes transaction 1.

The point of sale device of Merchant A (which may be like the POS device 220 of FIG. 2 or may send the information related to all transactions previously performed by the point of sale device, such as transaction 1, and information related to the transaction being conducted (i.e., transaction 2) to the respective smart payment device currently participating in the transaction being conducted to the respective smart payment device for storage in the smart payment digital ledger (353). At 354, the POS device of Merchant A receives, from the respective smart payment device currently participating in the transaction (i.e., transaction 2) being conducted with the point of sale device, the information related to all transactions (since the last connection by the respective smart payment device to a network) previously performed by the respective smart payment device of Customer X to the point of sale device for storage in the point of sale digital ledger 410A. The information related to the transactions may include payment account details, merchant identifying information, time, date, transaction amount, a unique item code, indication of whether the initiator of the transaction is the smart payment device or POS device, a localized snippet of the blockchain transactions, or the like. Alternatively, or in addition, a new transaction history for either a POS device or a smart payment device may only consume about 100 Gigabytes of memory.

To further illustrate the steps of the subprocess of FIG. 3B, additional transactions and transfers of transaction information from digital ledgers of the POS device and the respective digital ledgers from a respective smart payment device are explained below with reference to FIGS. 6-10.

Figure 6:
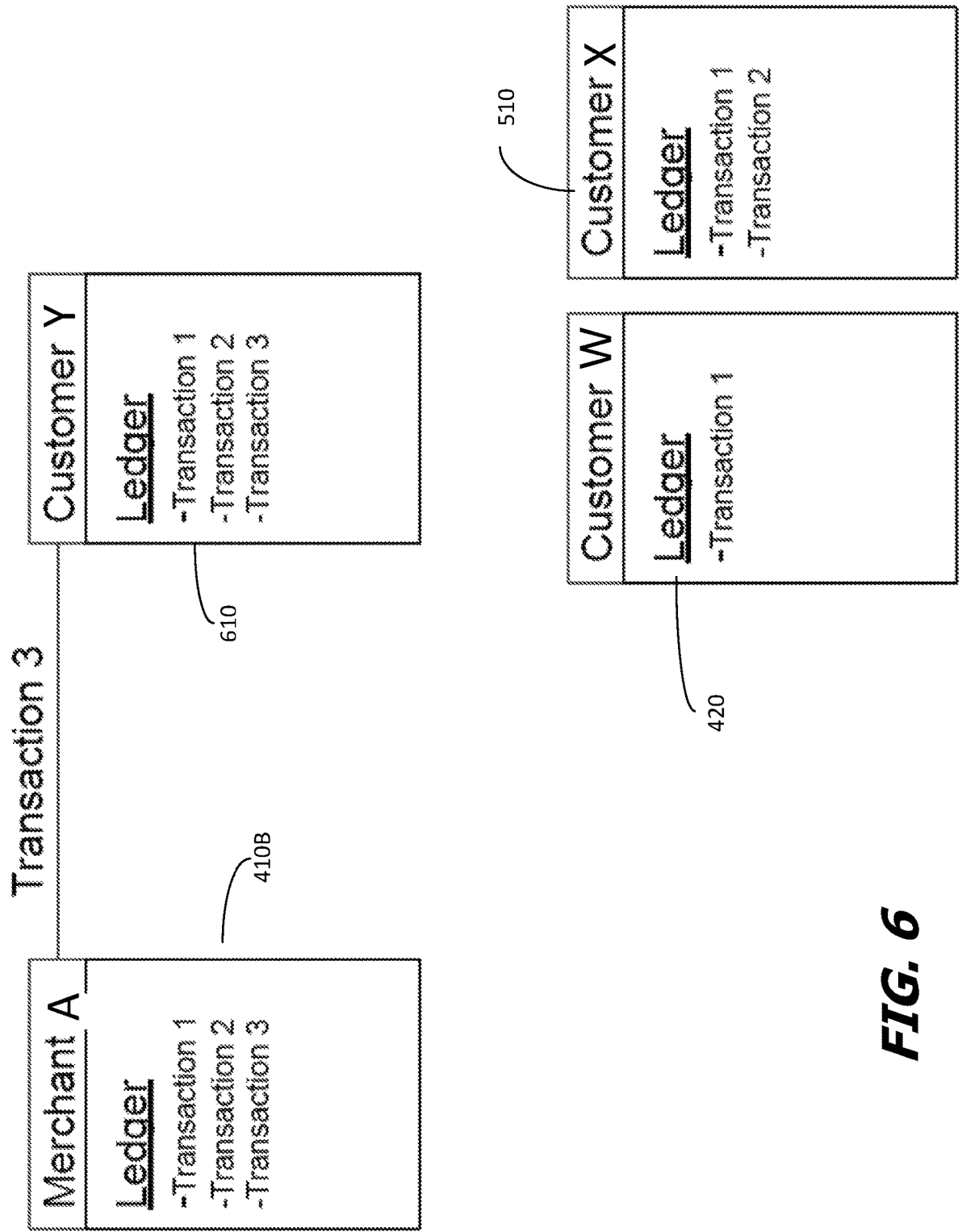

The further examples shown in FIGS. 6-10 illustrate the process as additional transactions are executed while the respective merchants and the respective smart payment devices in the examples are unable to establish a connection to the data network. In the example of FIG. 6, the POS device of Merchant A is executing a transaction with another customer's, Customer Y, smart payment device. In the example of FIG. 6, the POS device of Merchant A stores information related to transaction 3 in the digital ledger 410B with the transaction information from transactions 1 and 2. In addition, as mentioned in step 353 above, the POS device sends transaction information related to previously-performed transactions 1 and 2 and, in some examples, the information from transaction 3, to the smart payment device held by Customer Y. The smart payment device held by Customer Y stores in its digital ledger 610 the transaction information for transactions 1 and 2 sent by the POS device of Merchant A. In addition, the smart payment device held by Customer Y stores in its digital ledger 610 the transaction information for transaction 3 sent by the POS device of Merchant A. Alternatively, or in addition, the transaction information generated by the smart payment device held by Customer Y for transaction 3 may also be stored with the transaction 3 transaction information sent by the POS device of Merchant A in the smart payment device digital ledger 610. Of course, the transaction information generated by the smart payment device held by Customer Y for transaction 3 may also be stored separately (not shown in this example).

Also shown in the example of FIG. 6 are digital ledger 420 for the smart payment device of Customer W, which contains the transaction information for transaction 1, and the digital ledger 510 for the smart payment device of Customer X, which contains the transaction information for transactions 1 and 2.

Figure 7:
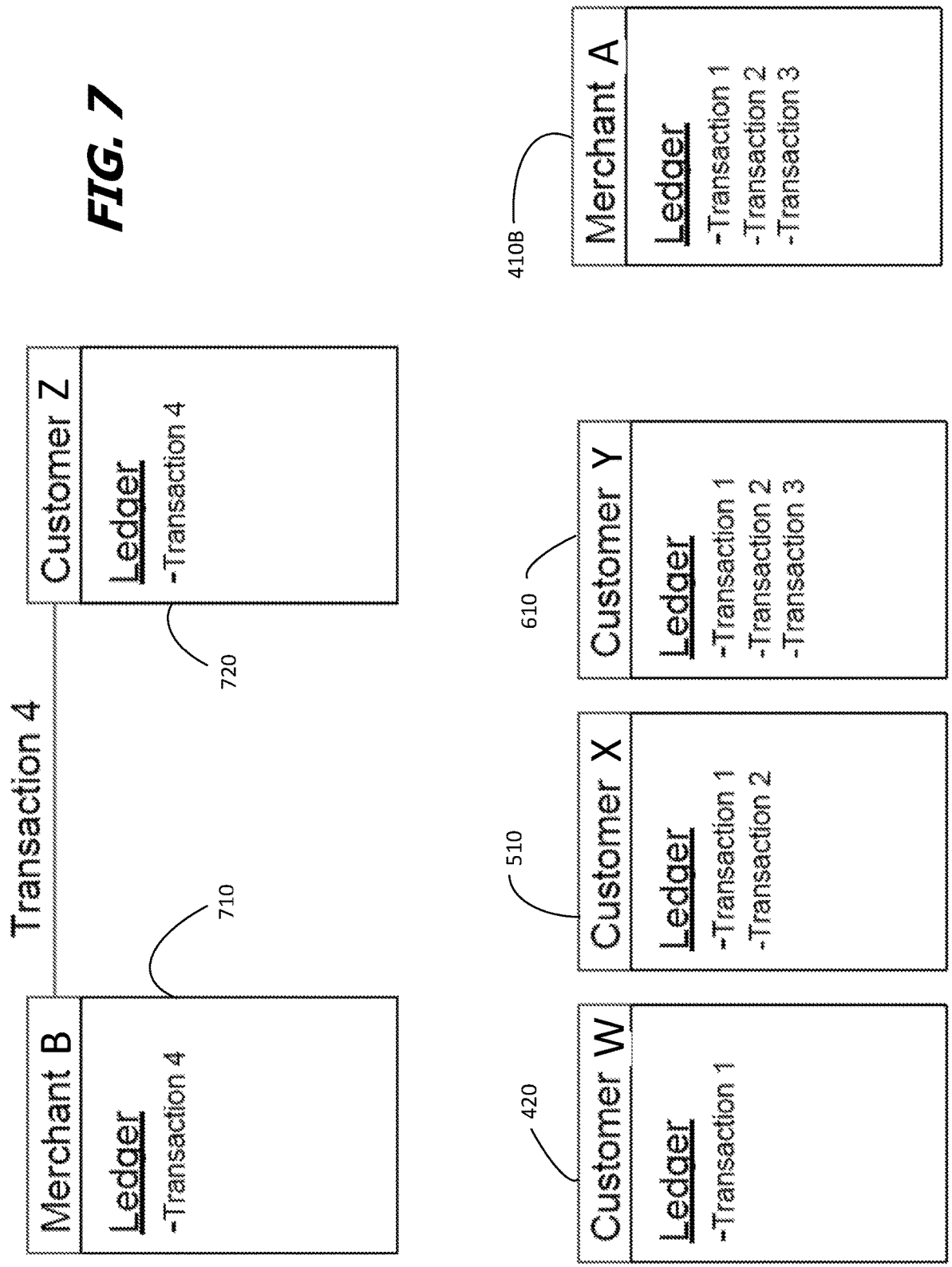

Continuing with the discussion of the exchange of transaction information, the example of FIG. 7 introduces a second merchant POS device, such as Merchant B, and a POS device digital ledger 710. The second merchant POS device is operable to perform the process steps 310-354 discussed above with reference to FIGS. 3A and 3B. In the FIG. 7 example, the Merchant B POS device executes Transaction 4 with the smart payment device of Customer Z, and each of Merchant B POS device and smart payment device of Customer Z may store transaction information of Transaction 4 in their respective digital ledgers 710 (i.e., Merchant B's digital ledger) and 720 (Customer Z's digital ledger). The other digital ledgers 410B (Merchant A), 420 (Customer W), 510 (Customer X), and 610 (Customer Y) maintain the transaction information from the earlier examples of FIGS. 4-6.

Figure 8:
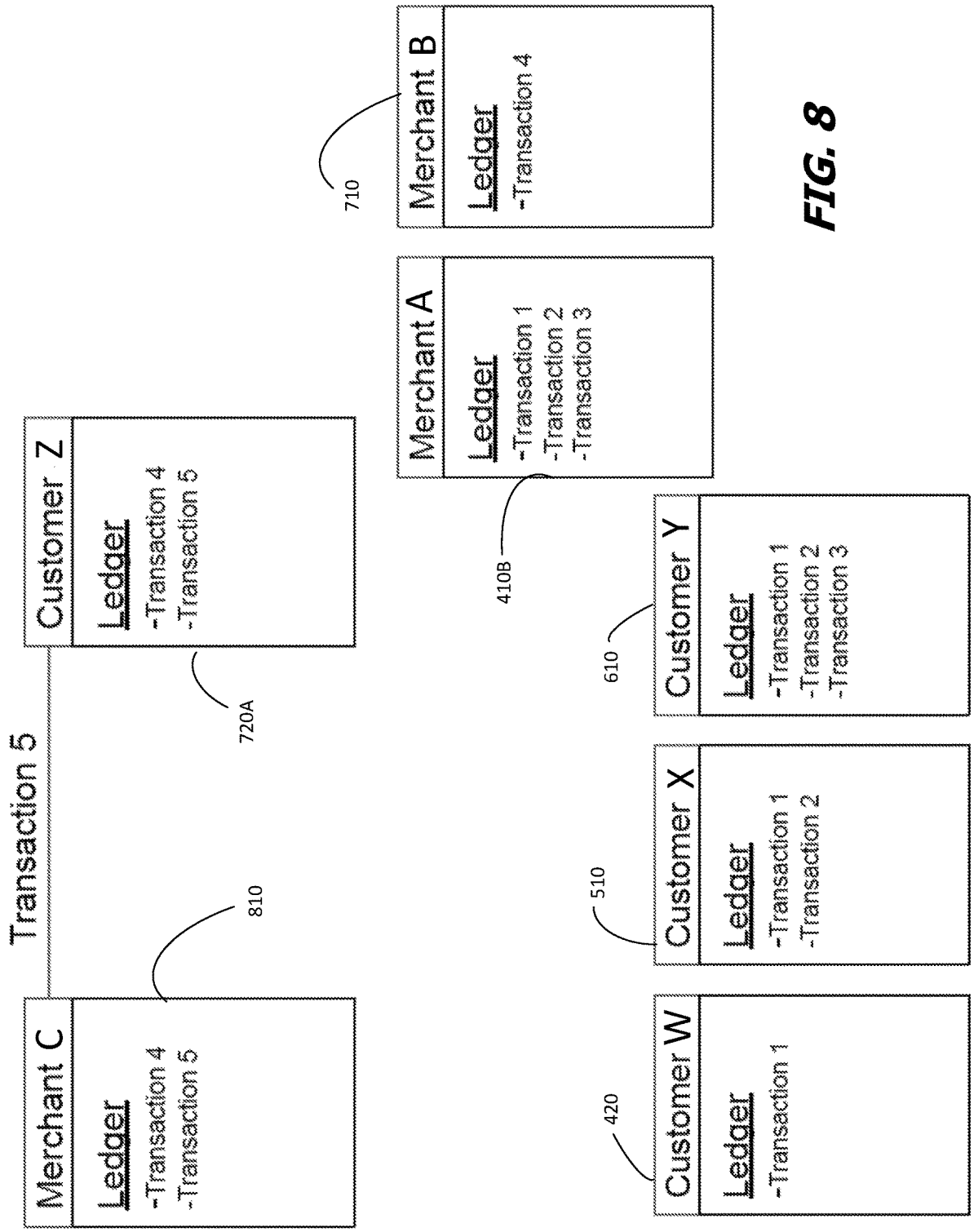

Additional merchants and customers, like Merchants A and B and customers W, X, Y and Z, that also cannot make a connection with a network may become involved as shown in the example of FIG. 8. In the example of FIG. 8, a new merchant, Merchant C, may execute a transaction with Customer Z. The transaction between Merchant C and Customer Z may be labeled transaction 5, and transaction information related to transaction 5 is stored in the digital ledger 810 maintained by the POS device of Merchant C. The smart payment device of Customer Z may maintain new transaction information related to transaction 5 in a digital ledger, such as 720A, with transaction information from previously-performed transactions, such as transaction 4. The transaction information for transaction 4 that was previously stored by the smart payment device of Customer Z in the digital ledger 720 example of FIG. 7 is copied and shared with the POS device of Merchant C. As mentioned above, the POS device of Merchant C stores the transaction information of transaction 4, which was a transaction between Merchant B and Customer Z. The other digital ledgers 410B (Merchant A), 420 (Customer W), 510 (Customer X), 610 (Customer Y), and 710 (Merchant B) maintain the transaction information from the earlier examples of FIGS. 4-7.

Figure 9:
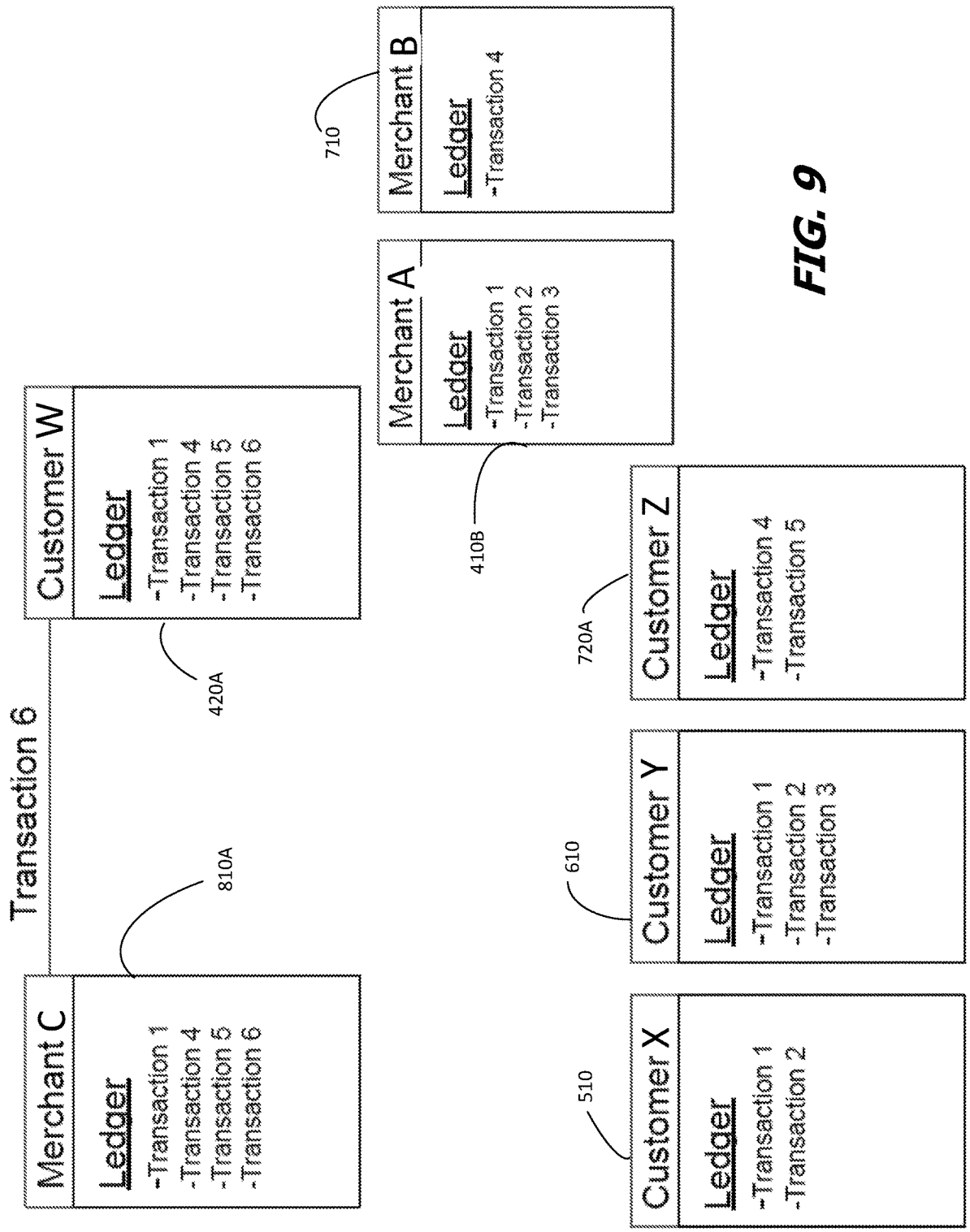

The example of FIG. 9 illustrates a further example of the copying of transaction information between the respective POS device and a smart payment device. In the example of FIG. 9, the POS device of Merchant C is executing a transaction (transaction 6) with the smart payment device of Customer W. Recall that Customer W had previously performed a transaction with Merchant A in the example of FIG. 4. Prior to execution of transaction 6 and as shown in the example of FIG. 8, the digital ledger 810 of the POS device of Merchant C contained transaction information from transactions 4 and 5 and the digital ledger 420 of the smart payment device of Customer W contained transaction information from transaction 1.

Upon execution of transaction 6 in the example of FIG. 9, transaction information related to transaction 6 is stored in the digital ledger 810A maintained by the POS device of Merchant C. In addition, the transaction information from previously-performed transactions 1, 4 and 5 that was stored in the digital ledger of the smart payment device associated with. Similarly, the transaction information related to transaction 6 is stored in the digital ledger 810A maintained by the POS device of Merchant C along with the transaction information from transactions 1, 4 and 5.

As the number of transactions increases, the merchants are exposed to more risk of a fraudulent transaction or an invalid transaction (i.e., over drawing an account which may be not enough money in an account to pay the merchant). For example, the merchant point of sale device may have, or may have access to, a dashboard provided by an enterprise or financial institution that enables a merchant system to track a number of off-network transactions so a limit on the number of off-network transactions is not exceeded. In a further example, the smart payment device may have a counter that may be used to limit the number of off-network transactions to mitigate the potential of fraudulent transactions or invalid transactions.

Figure 10:
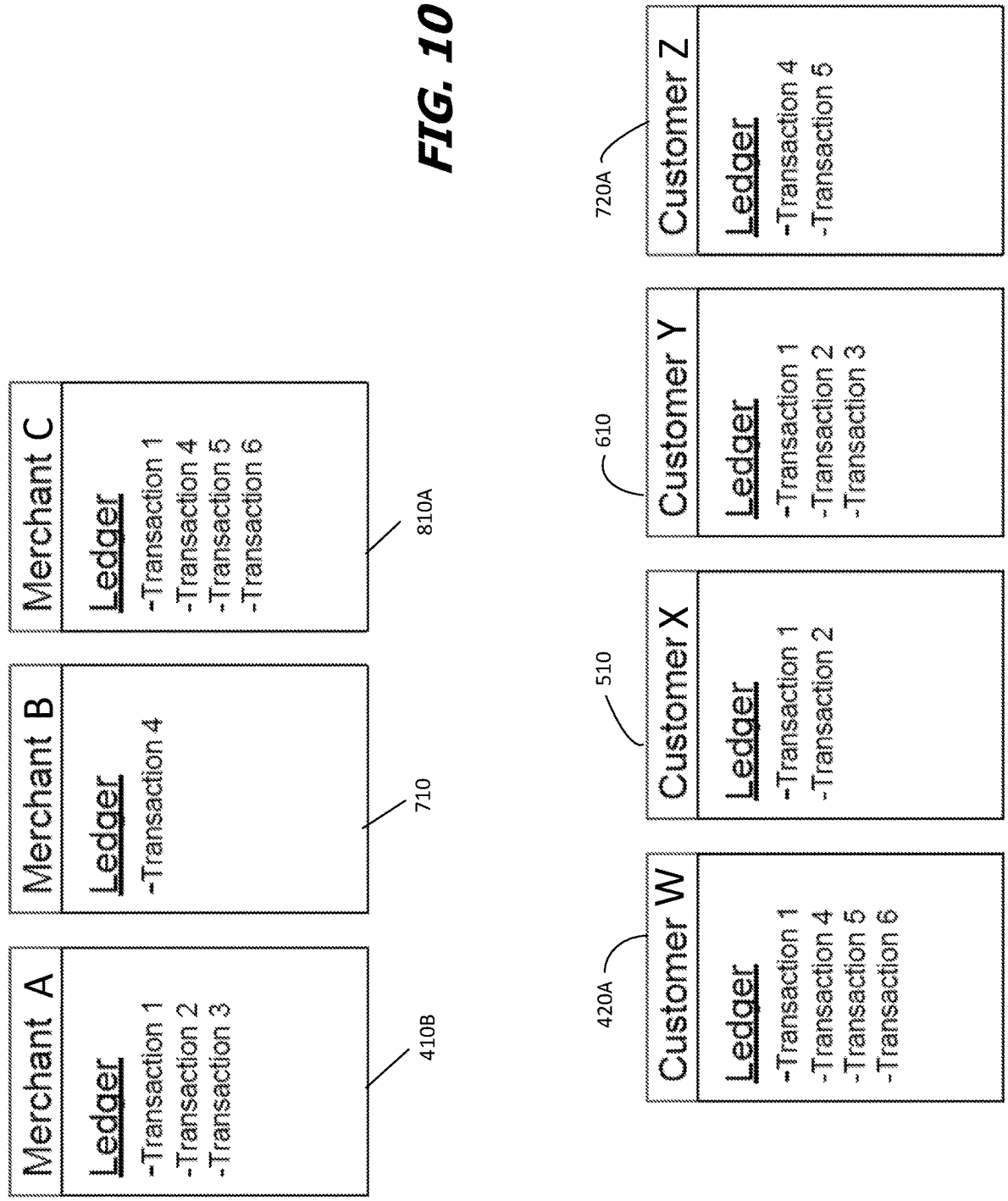

FIG. 10 illustrates an example of digital ledgers of merchant point of sale devices and smart payment devices of customers after completing off-network transactions described in the examples of FIGS. 4-9. In the example of FIG. 10, the Merchant A POS device may have a digital ledger 410B that includes information related to transactions 1, 2 and 3. The Merchant B POS device may have a digital ledger 710 that includes information related to transaction 4. The Merchant C POS device may have a digital ledger 810A that includes information related to transactions 1, 4, 5 and 6. The Customer W smart payment device may have a digital ledger 420A that includes information related to transactions 1, 4, 5 and 6. The Customer X smart payment device may have a digital ledger 510 that includes information related to transactions 1 and 2. The Customer Y smart payment device may have a digital ledger 610 that includes information related to transactions 1, 2 and 3. The Customer Z smart payment device may have a digital ledger 720A that includes information related to transactions 4 and 5.

Returning back to FIG. 3A, the process 300 further includes the point of sale device uploading, when the point of sale device establishes a connection with the data communication network, transactions stored in the point of sale ledger of the point of sale device to a blockchain platform (360). The blockchain platform is operable to receive, from each respective smart payment device of the one or more smart payment devices, transactions stored in a smart payment digital ledger of each respective smart payment device to the blockchain platform whenever each respective smart payment device of the one or more smart payment devices establishes a connection with the data communication network. The point of sale device may, upon receiving an indication of a successful uploading, clear the point of sale digital ledger in the point of sale device memory (370).

As mentioned with respect to step 360 of process 300, when a merchant POS device establishes a connection with a network, transactions stored in the POS device digital ledger are uploaded by the merchant POS device to a blockchain platform. Similarly, when a smart payment device establishes a connection with a network, transactions stored in the smart payment device digital ledger are uploaded by the smart payment device to the blockchain platform.

The blockchain platform may be formed from a number of nodes, such as enterprise nodes 50 and 52 of FIG. 1. In addition, the private blockchain platform 33 may have a number of subscribers, which may be enterprise customers, such as payment card users and merchants. Each payment card user may have a payment account. Each respective payment account may include information useable to identify and authenticate the user, information related to off-network transactions, information related to credit limits, account balance details, user preferences, past transactions, pending transactions, and the like. The information related to the off-network transactions may include a number of authorized off-network transactions before a connection with a network has to be established, a transaction amount limit (i.e., monetary limit), an aggregate off-network transaction amount limit (i.e., monetary limit for total number of off-network transactions), a geographic location setting in which off-network transactions are permitted or not, or the like. Each merchant may have a merchant account. Each merchant account may include information related to an account balance, account receivable limits, past transactions, pending transactions, off-network transaction information, and the like. The merchant account off-network transaction information may include information related to an aggregate monetary amount limit of all off-network transactions, a daily monetary amount limit for off-network transactions, a maximum period of time before a network connection must be established (i.e., a total time period during which off-network transactions are permitted), or the like. Each respective node (for example, nodes 50, 52 and server 53) of the number of nodes in the private blockchain platform 33 may maintain in storage, such as distributed ledger device storage devices 57-59, information related to: the status of the payment accounts and the merchant accounts, the off-network transactions performed by each payment account user and each merchant, or the like.

Information about the status of each respective payment account and merchant account, including a list of transactions undertaken by each respective the account, are maintained within a digital ledger distributed between nodes of the private blockchain platform. For example, a copy of the distributed public ledger is maintained by each node in the private blockchain platform.

Each of the POS devices and smart payment devices may have a computer application being executed by the respective device's processor. FIG. 3C illustrates another example of a process for executing off-network transactions. In a further example of a process for performing off-network transactions that may be applicable to either the POS device or a smart payment device, the process 388 of FIG. 3C may be executed by a processor executing programming code (e.g., a computer application or the like) stored in a non-transitory computer readable medium. In the example of FIG. 3C, the process 388 is described as being performed by a smart payment device, such as a mobile smart phone or similar smart device, or a payment card as described with reference to other examples. However, the process 388 may also be performed by a point of service device, such as those described with reference to other examples.

In the process 388, the smart payment device may determine that a connection with a data network is unable to be established (391), which may mean, for example, a data network is unavailable. In response to participating in a present transaction with a point of sale device while the connection with the data network is unable to be established, the point of sale device may generate information related to the present transaction (392). For example, as the transaction is completing, the smart payment device may generate a transaction hash value of the present transaction that uniquely identifies the present transaction and store the transaction hash value with a transaction identifier in the memory of the smart payment device. The smart payment device may generate the transaction hash value by applying a hash function to at least one of a payment account identifier associated with the smart payment device, an account identifier associated with the respective point of sale device participating in the respective transaction, an amount of the transaction, a time stamp, a date stamp, or a respective transaction identifier. Conversely, if the point of sale device is executing this process, the point of sale device may apply the hash function to at least one of a merchant account identifier associated with the point of sale device, a payment account identifier associated with the respective smart payment device participating in the respective transaction, an amount of the transaction, a time stamp, a date stamp, or a respective transaction identifier.

During or upon completion of the present transaction at 393, the smart payment device may receive from the point of sale device a copy of past transaction information of transactions executed by the point of sale device. The copy of past transaction information of the point of sale device may be related to each past transaction in which the point of sale device participated since the point of sale last connected to the data network.

At 394, the smart payment device may send, a copy of past transaction information of the smart payment device to the point of sale device. The past transaction information in the copy of the past transaction information of the smart payment device may related to each past transaction in which the smart payment device participated since the smart payment device last connected to the data network.

The generated information related to the present transaction, the past transaction information of the smart payment device, and the copy of the past transaction information received from the point of sale device may be stored in a digital ledger in a memory of the smart payment device until a connection to the data network is established (395). Prior to storing the past transaction information of the smart payment device and the copy of the past transaction information received from the point of sale device in a digital ledger in a memory of the smart payment device, the smart payment device may determine if a ledger entry related to the point of sale device is nonexistent in the digital ledger in the memory of the smart payment device. In response to a determination that a ledger entry is nonexistent, the smart payment device may generate a ledger entry related to the point of sale device in the digital ledger in the memory of the smart payment device.

In a further example, when the smart payment device determines that a connection with the data network is available as in step 395. The smart payment device, in response to the determination that a connection with the data network is available, may establish the connection with the data network. Via the connection with the data network, the smart payment device may access a private blockchain platform. In response to accessing the private blockchain platform, the smart payment device may upload the transaction hash value to a distributed ledger within the private blockchain platform.

In addition, the smart payment device may send to the digital ledger resolution component, via the established connection to the data network, the generated information related to the present transaction, and as part of the generated information related to the present transaction, a transaction hash value for the present transaction and an individual past transaction hash value for each individual past transaction represented by the past transaction information of the smart payment device.

In a further example, upon establishing a connection to the data network, the smart payment device may access a digital ledger resolution component coupled to the data network. The smart payment device may provide information that authenticates (by exchanging information related uniquely to the smart payment device) the smart payment device to the digital ledger server. In response to a successful authentication exchange, the generated information related to the present transaction, past transaction information of the smart payment device, and the copy of the past transaction information received from the point of sale device stored in the digital ledger in the memory of the smart payment device may be uploading to the digital ledger resolution component and to the blockchain platform coupled to the digital ledger resolution component. In response to the uploading while the smart payment device is connected to the data network, the smart payment device may clear the digital ledger in the memory of the smart payment device for, in an example, future transactions or the like.

Figure 11:
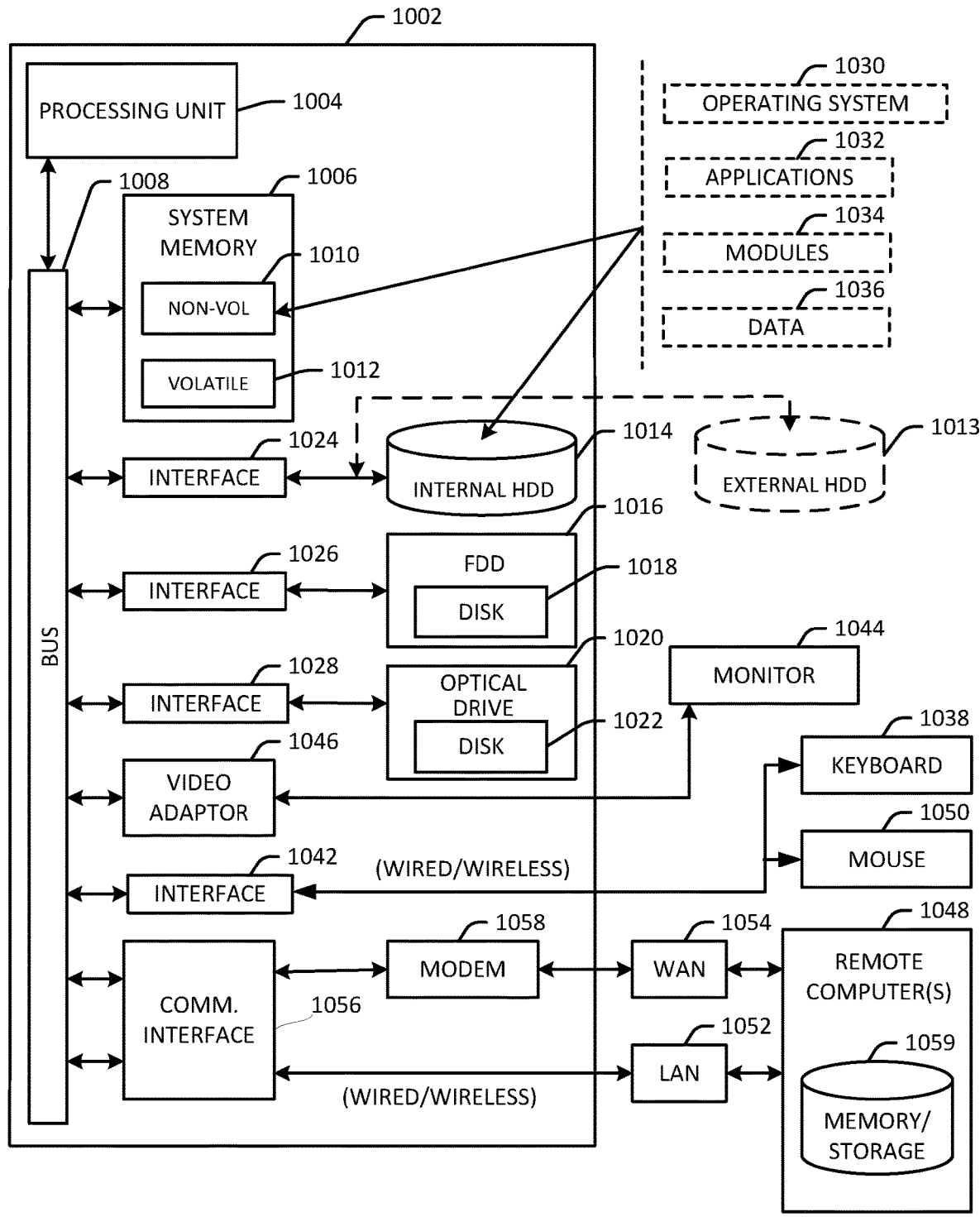
FIG. 11 illustrates an example of a computer architecture suitable implementing one or more of the components or devices described with respect to the examples of FIGS. 1-3C.

FIG. 11 illustrates an example of an exemplary computing architecture 1000 suitable for implementing various examples as previously described. In one example, the computing architecture 1000 may include elements of or be implemented as part of system 100 of FIG. 1. For example, one or more of the point of sale devices (e.g., 61-63), smart payment devices (e.g., 11 and 12), nodes 50 or 52 or server 53 of the blockchain platform 33 may include a portion of or all of the elements of the computing architecture 1000.

As used in this application, the terms "system" and "component" are intended to refer to a computer-related entity, either hardware, a combination of hardware and software, software, or software in execution, examples of which are provided by the example computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 1000.

As shown in FIG. 11, the computing architecture 1000 includes a processing unit 1004, a system memory 1006 and a system bus 1008. The processing unit 1004 can be any of various commercially available processors.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated example shown in FIG. 5, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal hard disk drive (HDD) 1014 (or external hard disk drive (HDD) 1013), a magnetic floppy disk drive (FDD) 1016 to read from or write to a removable magnetic disk 1018, and an optical disk drive 1020 to read from or write to a removable optical disk 1022 (e.g., a CD-ROM or DVD). The internal HDD 1014 or external HDD 1013, FDD 1016 and optical disk drive 1020 can be connected to the system bus 1008 by an HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of computer program modules can be stored in the drives and memory 1010, 1012, including an operating system 1030, one or more application programs 1032, other program modules 1034, and program data 1036. In one example, the one or more application programs 1032, other program modules 1034, and program data 1036 can include, for example, the various applications and/or components of the computing architecture 1000 as well components and applications operable to provide the functions and operations described with reference to the examples of FIGS. 1-10.

A user can enter commands and information into the computer 1002 through one or more wire/wireless input devices, for example, a keyboard 1038 and a pointing device, such as a mouse 1050. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 1004 through communication interface 1056 that is coupled to the system bus 1008 but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked platform using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all the elements described relative to the computer 1002, although, for purposes of brevity, only a memory/storage device 1059 is illustrated. The logical connections depicted include wire/wireless connectivity to a local area network (LAN) 1052 and/or larger networks, for example, a wide area network (WAN) 1054. Such LAN and WAN networking platforms are commonplace in offices and companies, and facilitate enterprise-wide computer networks, such as intranets, all of which may connect to a global communications network, for example, the Internet.

When used in a LAN networking platform, the computer 1002 is connected to the LAN 1052 through a wire and/or wireless communication interface 1056. The communication interface 1056 can facilitate wire and/or wireless communications to the LAN 1052, which may also include a wireless access point disposed thereon for communicating with the wireless functionality of the communication interface 1056.

When used in a WAN networking platform, the computer 1002 can include a modem 1058, or is connected to a communications server on the WAN 1054 or has other means for establishing communications over the WAN 1054, such as by way of the Internet. The modem 1058, which can be internal or external and a wire and/or wireless device, connects to the system bus 1008 via the input device interface 1042. In a networked platform, program modules depicted relative to the computer 1002, or portions thereof, can be stored in the memory/storage device 1059. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-4 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 12:
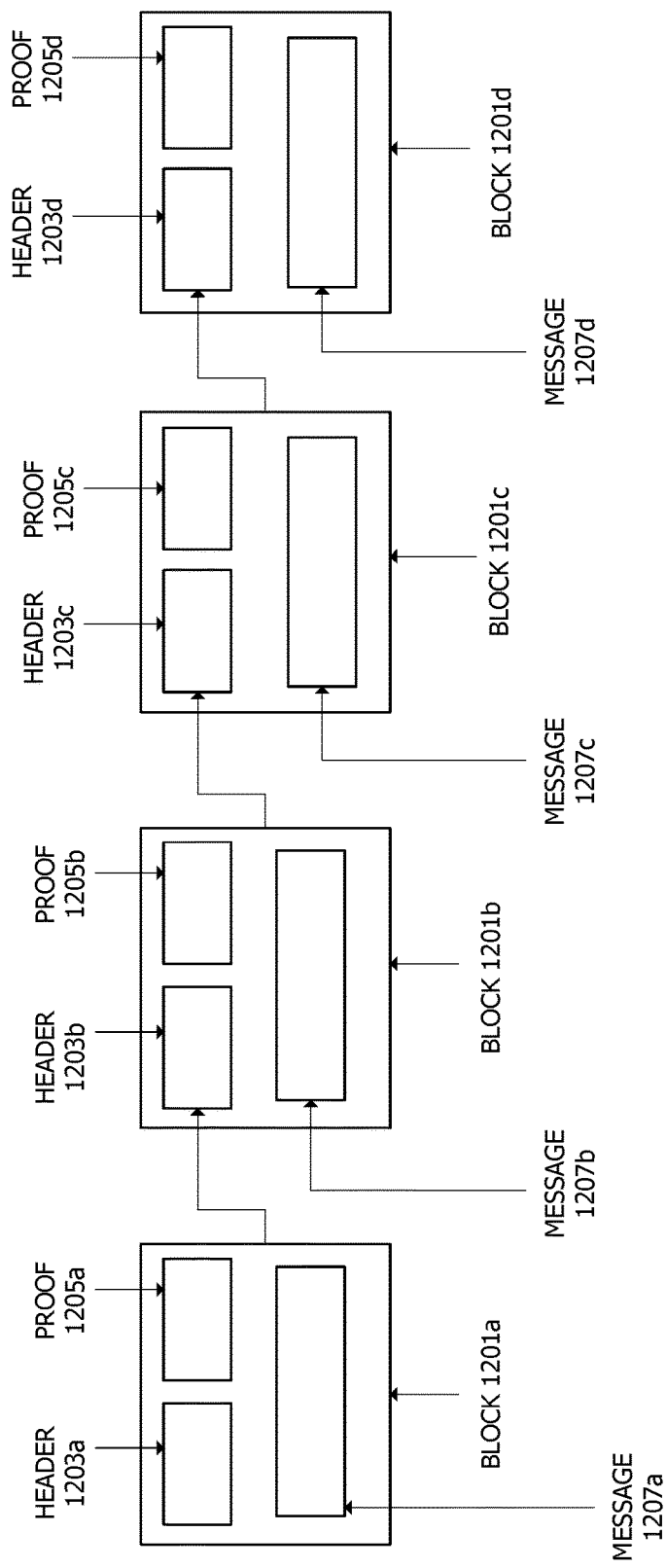
FIG. 12 is a diagram illustrating various components of an example of a blockchain that may be used to manage digital ledgers in the system example of FIG. 1.
Figure 13:
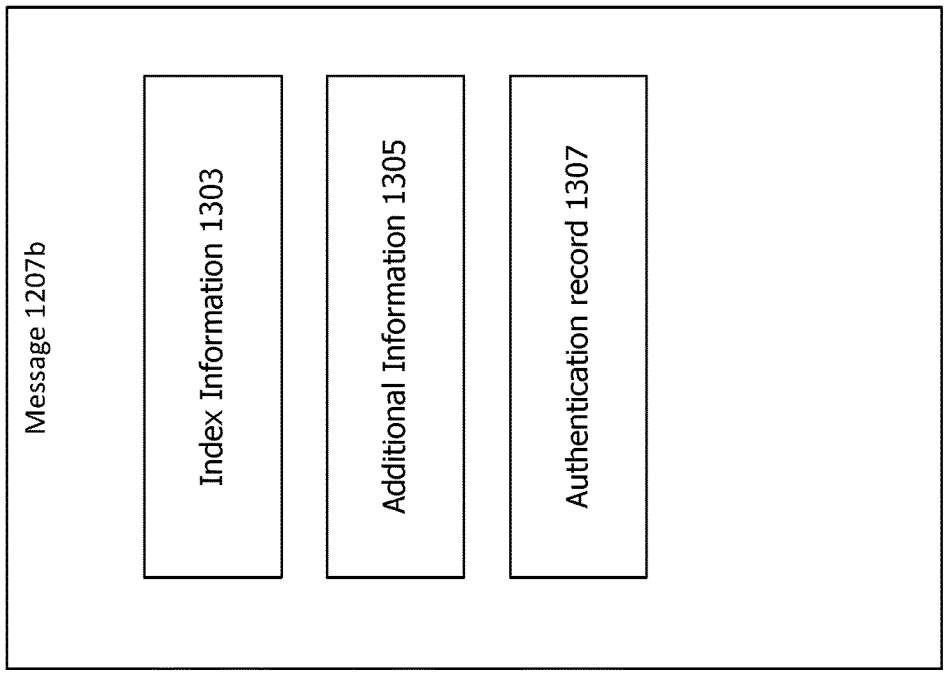
FIG. 13 is a block diagram illustrating exemplary fields of a block message that may be included in a block of the blockchain example of FIG. 12.

FIGS. 12 and 13 illustrate various aspects of a blockchain block which may be used to maintain off-network transactions in the blockchain platform 33 to enable auditing and confirmation of transactions. As mentioned with reference to FIG. 1, the digital ledger server 45 may, if necessary, access particular transactions (e.g., merchant transaction data, payment account transaction data, or both) stored in the blockchain maintained by the blockchain platform 33.

FIG. 12 depicts a logical model example of a blockchain 1200. In the example, the blockchain 1200 may comprise blocks, such as blocks 1201a-1201d. Blocks may include messages, such as messages 1207a-1207d and a header, such as headers 1203a-1203d, which uniquely identifies each block. The headers 1203a-1203d may include a hash value generated by a hash function. A hash function is any function that can be used to map input data of arbitrary size to a hash value of a fixed size. For example, a header may include at least one of the previous block's hash value, a hash value generated based on any messages in the block (e.g., a Merkle root), and a timestamp. In the example of FIG. 1, the blockchain platform 33 may require that blocks added to blockchain 1200 satisfy at least one of a proof-of-work condition (e.g., a proof 1205a-1205d) and a digital signature condition. For example, the headers 1203a-1203d may include a nonce chosen to ensure the header satisfies the proof-of-work condition. As a non-limiting example, the proof-of-work condition may require the hash of the header fall within a predetermined range of values. As an additional example, the header may be digitally signed with a cryptographic key of an authorized system, and the digital signature may be included in the header. This digital signature may be verified using a key available to the merchants and payment account holders participating in the blockchain platform 33. Generally, one or more designated nodes of the blockchain platform (e.g., the member device or host device) may generate blocks 1201*a*-1201*d* including headers 1203*a*-1203*d*, proofs 1205*a*-1205*d*, and messages 1207*a*-1207*d* to maintain a record of off-network transactions.

FIG. 13 depicts a logical model of a message 1207*b* stored in a blockchain (e.g., an element of blockchain 1200). As described with regard to FIG. 1, the enterprise server 53 or enterprise nodes 50 or 52 of the blockchain platform 33 may generate a blockchain messages based on transaction information received from the respective merchant and smart payment devices such as the message 1207*b*. In an example, message 1207*b* may comprise index information 1303. For example, the index information 1303 may comprise information identifying a payment card account (for a smart payment device) or a merchant account (for a merchant POS device). In various aspects, index information 1303 may include one or more references to earlier blocks in the blockchain 1200. In a further example, index information 1303 may include one or more index information references to one or more earlier blocks associated with the same payment or merchant account. An index information reference may include, as a non-limiting example, a hash of a preceding block in the blockchain associated with the same user. In an example, the index information 1303 may be obfuscated or encrypted according to methods known to one of skill in the art. For example, index information 1303 may be encrypted with a cryptographic key. As an additional example, index information 1303 may comprise a hash of the at least one of a full name, payment account identifier or a merchant account identifier, payment account holder (e.g., authorized user or owner of account, or the like) information or merchant information (e.g., merchant name, merchant contact information, or the like) of the merchant account, or other non-sensitive personal or business information of the payment account holder or merchant account holder.

Message 1207*b* may include additional information 1305 related to the off-network transactions as described with reference to other examples. The additional information 1305 may include, for example, a list of inputs supporting the transaction such as a transaction amount, an identifier of a smart payment device (in the case of a payment account) or an identifier of the merchant POS device (in the case of a merchant account), a time stamp or a counter value of the transaction, name on the payment account or merchant account, and other transaction related information. For example, additional information 1305 may be obfuscated or encrypted according to methods known to one of skill in the art. For example, root system information 1305 may be encrypted with a cryptographic key.

Message 1207*b* may include an authentication record 1307 that includes information enabling subsequent auditing of transactions. For example, authentication record 1307 may identify at least one of a point of sale device and a smart payment card. For example, authentication record 1307 may identify at least one of a payment account holder identifier, payment account identifier, payment card information, merchant account holder, merchant account identifier, merchant identifier or the like. In another example, a result of the authentication request may include an indication that the authentication was successful or unsuccessful. In one or more examples, authentication record 1307 may be obfuscated or encrypted according to methods known to one of skill in the art. For example, authentication record 1307 may be encrypted with a cryptographic key.

Cryptographic keys may be used to encrypt elements of messages in blocks of the blockchain 1200. In an example, such cryptographic keys may be associated with a payment account related to a smart payment device or merchant account related to a point of sale device. In one or more examples, at least some of the cryptographic keys may be associated with authorized systems, such as a point of sale device or a smart payment device. Corresponding cryptographic keys may be available to decrypt the encrypted message elements. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element. In further examples, the corresponding cryptographic keys may be available to nodes 50 and 53 or server 52 of the blockchain platform 33.

Figure 14:
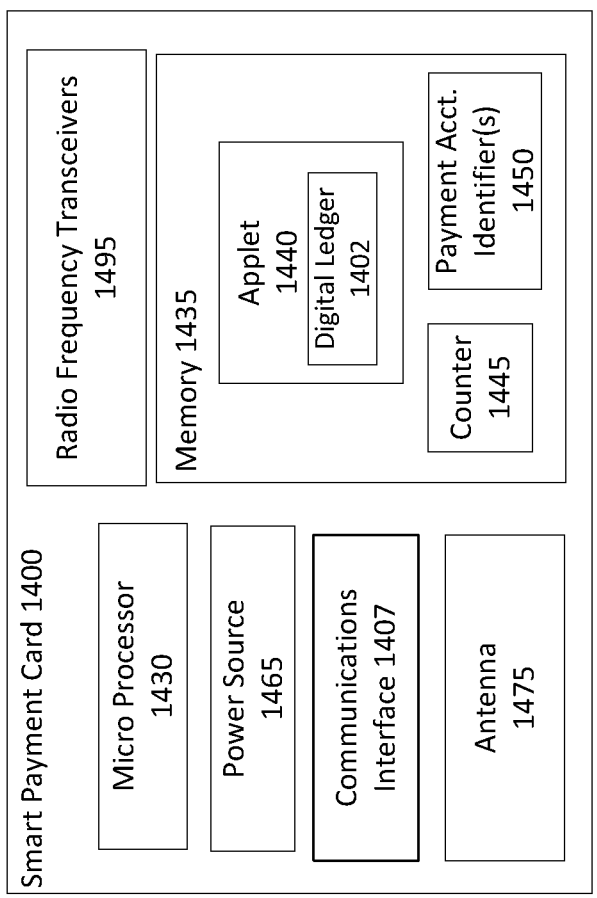
FIG. 14 illustrates an example of a smart payment device suitable for use with the system of FIG. 1.

It may be helpful to describe a contactless payment card that may function as a smart payment device. In the example of FIG. 14, a smart payment card may be a contactless card operable as a payment card, such as a credit card, debit card, or gift card, issued by a service provider/issuer. The smart payment card 1400 may have a look common to present credit cards in that a user name may be displayed on the front (or the back, in some examples) include a credit card number, a contact pad 220 as well as a service provider/issuer name.

The smart payment card 1400 may include a substrate (not shown), which may include a single layer, or one or more laminated layers composed of plastics, metals, and other materials. Examples of materials that may be used to form the substrate include polyvinyl chloride, polyvinyl chloride acetate, acrylonitrile butadiene styrene, polycarbonate, polyesters, anodized titanium, palladium, gold, carbon, paper, biodegradable materials, and or the like. In some examples, the smart payment card 1400 may have physical characteristics compliant with the ID-1 format of the ISO/IEC 7810 standard and may otherwise be compliant with the ISO/IEC 14443 standard. However, it is understood that the smart payment card 1400 according to the present disclosure may have different characteristics.

The smart payment card 1400 may also include processing circuitry, such as a microprocessor 1430, a power source 1465, a communications interface 1407, antenna 1475, a memory 1435 and radio frequency transceivers 1495.

The smart payment card 1400 may be powered by a power source 1465. The power source 1465 may be a battery, a power harvesting device, or the like. The memory 1435 may be a read-only memory, write-once read-multiple memory or read/write memory, e.g., RAM, ROM, and EEPROM, and the microprocessor 1430 may include one or more of these memories. For example, a read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 1435 may be operable to store one or more applets 1440, one or more counters 1445, and payment card account identifier(s) 1450. The one or more applet(s) 1440, one or more counters 345, and a payment card account identifier(s) 1450. The one or more applet(s) 1440 may comprise one or more software applications associated with a respective one or more service provider applications (provided, for example, by service provider such as an enterprise) and operable to execute on one or more payment cards, such as a Java Card applet. For example, an applet of applet(s) 1440 may be operable to respond to one or more requests, such as near-field data exchange (NDEF) requests, from a reader, such as a Near Field Communication (NFC) reader and produce an NDEF message that comprises a cryptographically secure OTP encoded as an NDEF text tag. According to an example, each applet may store a username for a user associated with the payment card account to access the associated service provider application. The one or more counters 1445 may comprise a numeric counter sufficient to store an integer that, in some examples, is representative of the number of times the smart payment card 1400 is used, for example, for off-network transactions.

The payment card identifier(s) 1450 may comprise a unique alphanumeric identifier assigned to a user of the smart payment card 1400 and/or one or more keys that together may be used to distinguish the user of the payment card from other payment card users. In some examples, the payment card identifier(s) 1450 may include information identifying both a customer and an account assigned to that customer and may further identify the payment card associated with the customer's account. The smart payment card 1400 may be built on a software platform operable on smart cards or other devices that comprises program code, processing capability and memory, such as JavaCard. In some examples, applets 1440 (i.e., computer applications) such as those described with reference to FIG. 3C may be executed by the microprocessor 1430. The radio frequency transceiver 1495 may be one or more of a Bluetooth® transceiver, a near-field communication (NFC) transceiver, a Wi-Fi transceiver, a cellular transceiver, or the like. The antenna 1475 may include one or more antennas that are coupled to the radio frequency transceiver 1495. The communications interface 1407 may be coupled to the microprocessor 1430 and the radio frequency transceivers 1495. The microprocessor 1430 may be coupled to the memory 1435 to execute the applet 1440 which makes the microprocessor 1430 operable to control the information emitted via the radio frequency transceivers 1495. For example, the microprocessor 1430 may receive transaction information from a POS device as mentioned above and store the received transaction information in the digital Ledger 1402. Conversely, the microprocessor 1430 may transmit transaction information (not shown in this example) retrieved from the digital ledger 1402.

The microprocessor 1430 may via the communications interface 1407, the radio frequency transceivers 1495, and the antenna 1475 be operable to communicate with a network access point via one or more short-range wireless communication protocols such as near-field communication (NFC), the Europay, Mastercard, Visa (EMV) standard, or the like, and in conformance with ISO/IEC 14443. Although NFC is used as an example communications protocol, the disclosure is equally applicable to other types of wireless communications, such as the EMV standard, Bluetooth, and/or Wi-Fi.

Communications performed by the microprocessor 1430 may be encrypted using information obtained from one or more of the components of the smart payment cared. Examples of encryption key generation techniques are also described in U.S. patent application Ser. No. 16/205,119, filed Nov. 29, 2018, the entire contents of which are incorporated by reference herein. In one example, a dynamic password relates to the counter 1445. In such an example, the dynamic password thus advantageously reflects previous behaviors of the holder of the smart payment card 1400. For example, the counter-based dynamic password may reflect the number of times that the user has used the smart payment card 1400 to perform an off-network transaction. For example, the number of times the smart payment card 1400 is used may be stored as the value of the counter 1445 and may be used by the microprocessor 1430 to prevent a user from performing a number of off-network transactions that exceeds a threshold. In one or more examples, the counter 1445 value of the number of off-network transactions participated in by the smart payment card 1400 may be provided to a POS device. Using this counter information, the POS device may determine whether another off-network transaction should be performed between the smart payment card 1400 and the POS device (shown in another example.

The payment account card identifier(s) 1450 may comprise a unique alphanumeric identifier assigned to a user of the smart payment card 1400 and/or one or more authentication keys (not shown) that together may be used to distinguish a user of the smart payment card 1400 as eligible to perform an off-network transaction from other payment card users who are ineligible to perform off-network transactions. In some examples, the payment card account identifier(s) 350 may include information identifying both a customer and an account assigned to that customer and may further identify the payment card (i.e., payment card number) associated with a user's payment account.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

The description for "computer storage media" states that examples of such a media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Each of these examples refers to technology for storing data in some form other than a signal. Instead of providing an exhaustive list, the Specification added that, given the previous examples, "computer storage media" can be considered to include any other medium which can be used to store the desired information, excluding from the definition of "computer storage media" any medium that can be used to transport or transmit.

Further, the manipulations performed are often referred to in terms, such as adding or comparing, which are commonly associated with mental operations performed by a human operator. No such capability of a human operator is reasonably possible, practical, or desirable in most cases, in any of the operations described herein, which form part of one or more examples. Rather, the operations are machine operations. Useful machines for performing operations of various examples include general purpose digital computers or similar devices.

Some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various examples also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the disclosed method steps. The structure for a variety of these machines will appear from the description given.

As used in this application, the terms "system" and "component" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, novel subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A non-transitory computer readable medium storing programming code that when executed is operable to cause a microprocessor of a smart payment device to perform functions, including functions to:

determine that a connection with a data network is unable to be established based on the data network or an access point to the data network being unavailable to establish the connection;

in response to participating in a present transaction with a point of sale device while the connection with the data network is unable to be established, generate information including a transaction hash value of the present transaction that uniquely identifies the present transaction;

during the present transaction, receive, from the point of sale device, as part of the generated information related to the present transaction, a transaction hash value for the present transaction and a copy of past transaction information of transactions executed by the point of sale device with other smart payment devices, wherein the copy of past transaction information of the point of sale device;
      is related to each past transaction in which the point of sale device participated with the other smart payment devices since the point of sale device last connected to the data network, and
      includes an individual past transaction hash value for each individual past transaction represented in the copy of the past transaction information of the smart payment device;

store the generated information including the transaction hash value with a transaction identifier in a memory of the smart payment device;

send to the point of sale device, a copy of past transaction information of the smart payment device, wherein past transaction information in the copy of the past transaction information of the smart payment device is related to each past transaction in which the smart payment device participated since the smart payment device last connected to the data network and includes the generated information; and store, until a connection to the data network is established, the generated information related to the present transaction, the past transaction information of the smart payment device, and the copy of the past transaction information received from the point of sale device in a digital ledger in a memory of the smart payment device;

establish a connection to the data network, wherein the data network or the access point is available to establish the connection to the data network;

in response to a successful authentication exchange, upload the generated information to a digital ledger resolution component, the digital ledger resolution component being coupled to a blockchain platform for storing transaction hash values maintained by each node in the blockchain platform, wherein the generated information is related to the present transaction including the transaction hash value, the past transaction information of the smart payment device, and the copy of the past transaction information received from the point of sale device stored in the digital ledger in the memory of the smart payment device; and enable funds owed to merchants to be disbursed based on the generated information, past transaction information, and the copy of the past transaction information uploaded to the digital ledger resolution component.

2. The non-transitory computer readable medium of claim 1, further storing programming code when executed is operable, prior to storing the past transaction information of the smart payment device and the copy of the past transaction information received from the point of sale device in a digital ledger in a memory of the smart payment device to cause a microprocessor to perform functions to:

determine if a ledger entry related to the point of sale device is nonexistent in the digital ledger in the memory of the smart payment device; and in response to a determination that a ledger entry is nonexistent, generate a ledger entry related to the point of sale device in the digital ledger in the memory of the smart payment device.

3. The non-transitory computer readable medium of claim 1, further storing programming code when executed is operable to cause a microprocessor, when generating the transaction hash value of the present transaction that uniquely identifies the present transaction, to further perform functions to:

apply a hash function to at least one of:
a payment account identifier associated with the smart payment device, an account identifier associated with a respective point of sale device participating in the present transaction, an amount of the transaction, a time stamp, a date stamp, or a respective transaction identifier.

4. The non-transitory computer readable medium of claim 1, further storing programming code when executed is operable to cause a microprocessor to perform functions to:

determine that a connection with the data network is available;

in response to the determination that a connection with the data network is available, establish the connection with the data network;

access a private blockchain platform via the connection with the data network; and in response to accessing the private blockchain platform, upload the transaction hash value to a distributed ledger within the private blockchain platform.

5. The non-transitory computer readable medium of claim 1, further storing programming code when executed is operable to cause a microprocessor to perform functions to:

in response to the connection to the data network being established, clear the digital ledger in the memory of the smart payment device.

6. The non-transitory computer readable medium of claim 1, further storing programming code when executed is operable to cause a microprocessor to perform functions to:

determine that a counter indicates a number of transactions made without a connection to a network that exceeds a limit for the number of transactions made without a connection to a network.

7. A method, comprising:

determining, by a smart payment device, that a connection with a data network is unable to be established based on the data network or an access point to the data network being unavailable to establish the connection;

in response to participating in a present transaction with a point of sale device while the connection with the data network is unable to be established, generating information including a transaction hash value of the present transaction that uniquely identifies the present transaction;

during the present transaction, receiving, from the point of sale device, a copy of past transaction information of transactions executed by the point of sale device with other smart payment devices, wherein the copy of past transaction information of the point of sale device is related to each past transaction in which the point of sale device participated with the other smart payment devices since the point of sale device last connected to the data network;

storing the generated information including the transaction hash value with a transaction identifier in a memory of the smart payment device;

sending to the point of sale device, a copy of past transaction information of the smart payment device, wherein past transaction information in the copy of the past transaction information of the smart payment device is related to each past transaction in which the smart payment device participated since the smart payment device last connected to the data network and includes the generated information; and storing, until a connection to the data network is established, the generated information related to the present transaction, the past transaction information of the smart payment device, and the copy of the past transaction information received from the point of sale device in a digital ledger in a memory of the smart payment device;

establishing a connection to the data network, wherein the data network or the access point is available to establish the connection to the data network;

in response to a successful authentication exchange, uploading the generated information to a digital ledger resolution component, the digital ledger resolution component being coupled to a blockchain platform for storing transaction hash values maintained by each node in the blockchain platform, wherein the generated information is related to the present transaction including the transaction hash value, the past transaction information of the smart payment device, the and the copy of the past transaction information received from the point of sale device stored in the digital ledger in the memory of the smart payment device; and enabling funds owed to merchants to be disbursed based on the generated information, past transaction information, and the copy of the past transaction information uploaded to the digital resolution component.

8. The method of claim 7, further comprising:

prior to storing the past transaction information of the smart payment device and the copy of the past transaction information received from the point of sale device in a digital ledger in a memory of the smart payment device, determining if a ledger entry related to the point of sale device is nonexistent in the digital ledger in the memory of the smart payment device; and in response to a determination that a ledger entry is nonexistent, generating a ledger entry related to the point of sale device in the digital ledger in the memory of the smart payment device.

9. The method of claim 7, further comprising:
when generating the transaction hash value of the present transaction that uniquely identifies the present transaction, applying a hash function to at least one of:
a payment account identifier associated with the smart payment device, an account identifier associated with a respective point of sale device participating in the present transaction, an amount of the transaction, a time stamp, a date stamp, or a respective transaction identifier.

10. The method of claim 7, further comprising:
in response to the connection to the data network being established, clearing the digital ledger in a memory of the smart payment device.

11. The method of claim 7, further comprising:
sending, via the established connection to the data network, as part of the generated information related to the present transaction, a transaction hash value for the present transaction and an individual past transaction hash value for each individual past transaction represented by the past transaction information of the smart payment device, to the digital ledger resolution component.

12. The method of claim 7, further comprising:
determining that a counter indicates a number of transactions made without a connection to a network that exceeds a limit for the number of transactions made without a connection to a network.

13. An apparatus, comprising:
a microprocessor operable to control a smart payment device,
a memory storing a digital ledger, counter and programming code;
a communications interface; and
an antenna, wherein the microprocessor is further operable to execute the programming code, and perform functions, including functions to:
  determine that a connection with a data network is unable to be established based on the data network or an access point to the data network being unavailable to establish the connection;
  in response to participating in a present transaction with a point of sale device while the connection with the data network is unable to be established, generate information including a transaction hash value of the present transaction that uniquely identifies the present transaction;
  during the present transaction, receive, from the point of sale device, a copy of past transaction information of transactions executed by the point of sale device with other smart payment devices, wherein the copy of past transaction information of the point of sale device is related to each past transaction in which the point of sale device participated with the other smart payment devices since the point of sale device last connected to the data network;
  store the generated information including the transaction hash value with a transaction identifier in a memory of the smart payment device;
  send to the point of sale device, a copy of past transaction information of the smart payment device, wherein past transaction information in the copy of the past transaction information of the smart payment device is related to each past transaction in which the smart payment device participated since the smart payment device last connected to the data network and includes the generated information; and
  store, until a connection to the data network is established, the generated information related to the present transaction, the past transaction information of the smart payment device, and the copy of the past transaction information received from the point of sale device in a digital ledger in a memory of the smart payment device;
  establish a connection to the data network, wherein the data network or the access point is available to establish the connection to the data network;
  in response to a successful authentication exchange, upload the generated information to a digital ledger resolution component, the digital ledger resolution component being coupled to a blockchain platform for storing transaction hash values maintained by each node in the blockchain platform, wherein the generated information is related to the present transaction including the transaction hash value, the past transaction information of the smart payment device, and the copy of the past transaction information received from the point of sale device stored in the digital ledger in the memory of the smart payment device; and
  enable funds owed to merchants to be disbursed based on the generated information, past transaction information, and the copy of the past transaction information uploaded to the digital resolution component.

14. The apparatus of claim 13, wherein the microprocessor is operable, prior to storing the past transaction information of the smart payment device and the copy of the past transaction information received from the point of sale device in a digital ledger in a memory of the smart payment device to execute the programming code and perform further functions to:
  determine if a ledger entry related to the point of sale device is nonexistent in the digital ledger in the memory of the smart payment device; and
  in response to a determination that a ledger entry is nonexistent, generate a ledger entry related to the point of sale device in the digital ledger in the memory of the smart payment device.

15. The apparatus of claim 13, wherein the microprocessor is operable, when generating the transaction hash value of the present transaction that uniquely identifies the present transaction, to execute the programming code and perform further functions to:
  apply a hash function to at least one of:
  a payment account identifier associated with the smart payment device, an account identifier associated with a respective point of sale device participating in the present transaction, an amount of the transaction, a time stamp, a date stamp, or a respective transaction identifier.

16. The apparatus of claim 13, wherein the microprocessor is operable to execute the programming code and perform further functions to:
  determine that a connection with the data network is available;
  in response to the determination that a connection with the data network is available, establish the connection with the data network;
  access a private blockchain platform via the connection with the data network; and in response to accessing the private blockchain platform, upload the transaction hash value to a distributed ledger within the private blockchain platform.

17. The apparatus of claim 13, wherein the microprocessor is operable to execute the programming code and perform further functions to:
   in response to the connection to the data network being established, clear the digital ledger in the memory of the smart payment device.

18. The apparatus of claim 13, wherein the microprocessor is operable to execute the programming code and perform further functions to:
   send, via the established connection to the data network, as part of the generated information related to the present transaction, a transaction hash value for the present transaction and an individual past transaction hash value for each individual past transaction represented by the past transaction information of the smart payment device, to the digital ledger resolution component.

19. The apparatus of claim 13, wherein the microprocessor is operable to execute the programming code and perform further functions to:
   determine that the counter indicates a number of transactions made without a connection to a network that exceeds a limit for the number of transactions made without a connection to a network.

* * * * *

UNITED STATES PATENT AND TRADEMARK OFFICE
CERTIFICATE OF CORRECTION

PATENT NO. : 11,062,307 B2
APPLICATION NO. : 16/551275
DATED : July 13, 2021
INVENTOR(S) : Galen Rafferty et al.

Page 1 of 1

It is certified that error appears in the above-identified patent and that said Letters Patent is hereby corrected as shown below:

In the Claims

Column 24, Claim 1, Line 38; Please replace "sale device;" with --sale device:--

Column 26, Claim 7, Line 52; Please replace "smart payment device, the and the" with --smart payment device, and the--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*